US012747083B2

(12) United States Patent
Kawamura et al.

(10) Patent No.: US 12,747,083 B2
(45) Date of Patent: Sep. 29, 2026

(54) LIQUID EJECTION HEAD PACKAGE

(71) Applicant: CANON KABUSHIKI KAISHA, Tokyo (JP)

(72) Inventors: Shogo Kawamura, Kanagawa (JP); Michihiro Takahata, Fukushima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 18/827,378

(22) Filed: Sep. 6, 2024

(65) Prior Publication Data

US 2025/0083886 A1 Mar. 13, 2025

(30) Foreign Application Priority Data

Sep. 11, 2023 (JP) ................................ 2023-146696

(51) Int. Cl.

| | |
|---|---|
| ***B65D 81/05*** | (2006.01) |
| ***B41J 2/175*** | (2006.01) |
| ***B41J 29/00*** | (2006.01) |
| ***B65D 77/04*** | (2006.01) |

(52) U.S. Cl.

CPC .......... *B65D 81/05* (2013.01); *B41J 2/17533* (2013.01); *B41J 29/00* (2013.01); *B65D 77/04* (2013.01); *B65D 2581/053* (2013.01); *B65D 2581/055* (2013.01); *B65D 2585/689* (2013.01)

(58) Field of Classification Search

CPC .... B65D 2585/2892; B65D 2585/6892; B65D 5/2009; B65D 85/68; G03G 2215/0875

See application file for complete search history.

(56) References Cited

U.S. PATENT DOCUMENTS

| | | | | | |
|---|---|---|---|---|---|
| 2,755,982 | A * | 7/1956 | Lugt, Jr. | B65D 5/5021 | 229/162.1 |
| 6,209,995 | B1 * | 4/2001 | Grune | B41J 2/17503 | 347/85 |
| 8,662,303 | B2 * | 3/2014 | Yoshida | B65D 5/509 | 206/521 |
| 8,805,250 | B2 * | 8/2014 | Takami | G03G 21/181 | 399/119 |
| 10,434,788 | B2 * | 10/2019 | Tamaki | B41J 2/17553 | |

FOREIGN PATENT DOCUMENTS

| | | | | |
|---|---|---|---|---|
| JP | S6333285 | A | | 2/1988 |
| JP | H0772781 | B2 | | 8/1995 |
| JP | H1045109 | A | | 2/1998 |
| JP | 2000199995 | A | * | 7/2000 |
| JP | 2017102371 | A | * | 6/2017 |

* cited by examiner

*Primary Examiner* — Mollie Impink

(74) *Attorney, Agent, or Firm* — Canon U.S.A., Inc. IP Division

(57) ABSTRACT

A liquid ejection head package that secures a liquid ejection head configured to eject liquid, includes a protective member that protects an end of the liquid ejection head in a longitudinal direction, and a box member that packs the liquid ejection head having the protective member attached to the end thereof in the longitudinal direction. The box member includes a cushioning member at a position where the cushioning member contacts the protective member, where the cushioning member includes a cushioning portion having a space therein.

9 Claims, 30 Drawing Sheets

LIQUID EJECTION HEAD PACKAGE

BACKGROUND

Field

The present disclosure relates to a liquid ejection head package.

Description of the Related Art

A liquid ejection apparatus includes a liquid ejection head including an ejection element substrate and that is configured to eject liquid. If the ejection element substrate is damaged or contaminated, the accuracy of liquid ejection from the ejection element substrate can degrade, which can lead to ejection failure. When the liquid ejection head is to be transported, a cover member covering the ejection element substrate is attached to the liquid ejection head to prevent damage to and contamination of the ejection element substrate. The liquid ejection head is then packed in a bag member and placed in a box member together with a cushioning material (protective member).

As an example of such a package, Japanese Patent Laid-Open No. 7-72781 describes packing a cartridge in a bag member with a chuck when the cartridge is to be transported. After the cartridge described in Japanese Patent Laid-Open No. 7-72781 is placed in the bag member, protective members serving as cushioning materials and made of, for example, styrofoam, are attached to both the right and left sides of the cartridge, and the cartridge is packed in a box member.

Even when the cartridge is packed as in Japanese Patent Laid-Open No. 7-72781, the box member can be damaged by, for example, impact during transport or by drop impact, and even the protective members can be damaged. If the protective members are damaged, the impact is more easily transmitted to the cartridge protected by the protective members. In particular, when the cartridge is a liquid ejection head, the impact can damage the liquid ejection head.

SUMMARY

In view of the problem described above, the present disclosure provides a liquid ejection head package that reduces damage to a liquid ejection head.

According to an aspect of the present disclosure, a liquid ejection head package that secures a liquid ejection head configured to eject liquid, includes a protective member configured to protect an end of the liquid ejection head in a longitudinal direction, and a box member configured to pack the liquid ejection head having the protective member attached to the end thereof in the longitudinal direction. The box member includes a cushioning member at a position where the cushioning member contacts the protective member. The cushioning member includes a first cushioning portion having a first space therein.

Further features of the present disclosure will become apparent from the following description of exemplary embodiments with reference to the attached drawings.

DESCRIPTION OF THE EMBODIMENTS

Figure 1:
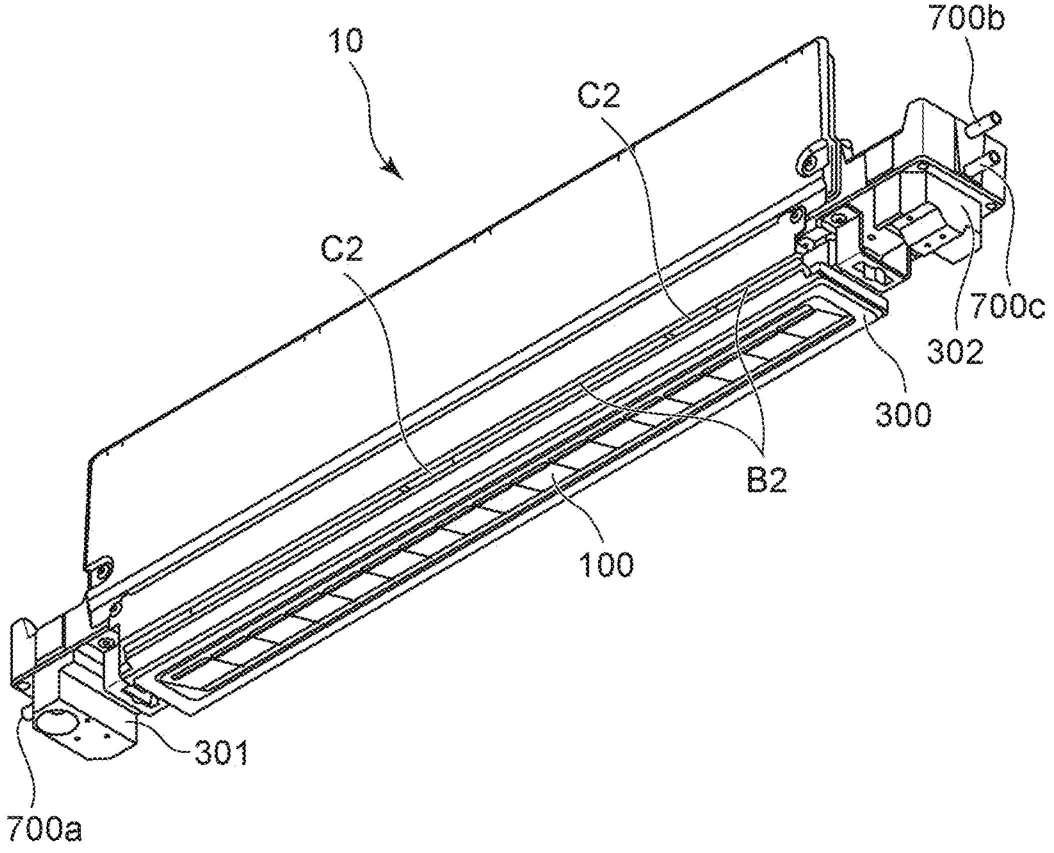
FIG. 1 is a perspective view of a liquid ejection head as seen from below.

Embodiments of the present disclosure will now be described using the drawings. Note that the following embodiments do not limit matters disclosed herein, and not all combinations of features described in the embodiments are essential to solutions in the present disclosure. Note that the same components are assigned the same reference numerals.

First Embodiment

FIG. 1 is a perspective view of a liquid ejection head according to an embodiment of the present disclosure. As illustrated in FIG. 1, a liquid ejection head 10 according to the embodiment of the present disclosure is a so-called line head in which a plurality of ejection element substrates 100 for ejecting liquid are arranged in a longitudinal direction. Although a line head will be described as an example in the present embodiment, the liquid ejection head 10 can be a so-called serial head that ejects liquid while scanning a recording medium.

The liquid ejection head according to the present embodiment is suitable for an inkjet recording apparatus.

As illustrated in FIG. 2, a cover member 200 is detachably attached to the liquid ejection head 10 to prevent damage to and contamination of the ejection element substrates and others during transport and handling. That is, the cover member 200 can cover the ejection element substrates 100 during transport and can be detached from the liquid ejection head 10 for using the liquid ejection head 10. Attachment and detachment of the cover member 200 to and from the liquid ejection head 10 will be described in detail below. Note that the position of the cover member 200 when engaging portions A1 and A2 (see FIG. 3) of the cover member 200 are attached to the liquid ejection head 10 is defined as an engagement position, whereas the position of the cover member 200 when the engaging portions A1 and A2 of the cover member 200 are at the positions of guide opening portions C1 and C2 (see FIG. 6B, FIG. 1) of the liquid ejection head 10 is defined as a release position.

As illustrated in FIG. 1, in the liquid ejection head 10 according to the embodiment of the present disclosure, the ejection element substrates 100 each having a plurality of orifices for ejecting liquid are arranged in the longitudinal direction (first direction) of the liquid ejection head. The ejection element substrates 100 constitute an ejection surface of the liquid ejection head 10. The ejection surface of the liquid ejection head 10 according to the embodiment of the present disclosure includes a cap surface 300 surrounding the ejection element substrates 100. The liquid ejection head 10 includes a protrusion 700*a* at one end thereof in the longitudinal direction, and also includes protrusions 700*b* and 700*c* at the other ends thereof in the longitudinal direction. The liquid ejection head 10 includes a first positioning member 301 below the one end of the liquid ejection head 10 in the vertical direction. The liquid ejection head 10 also includes a second positioning member 302 below the other end of the liquid ejection head 10 in the vertical direction.

Figure 2A:
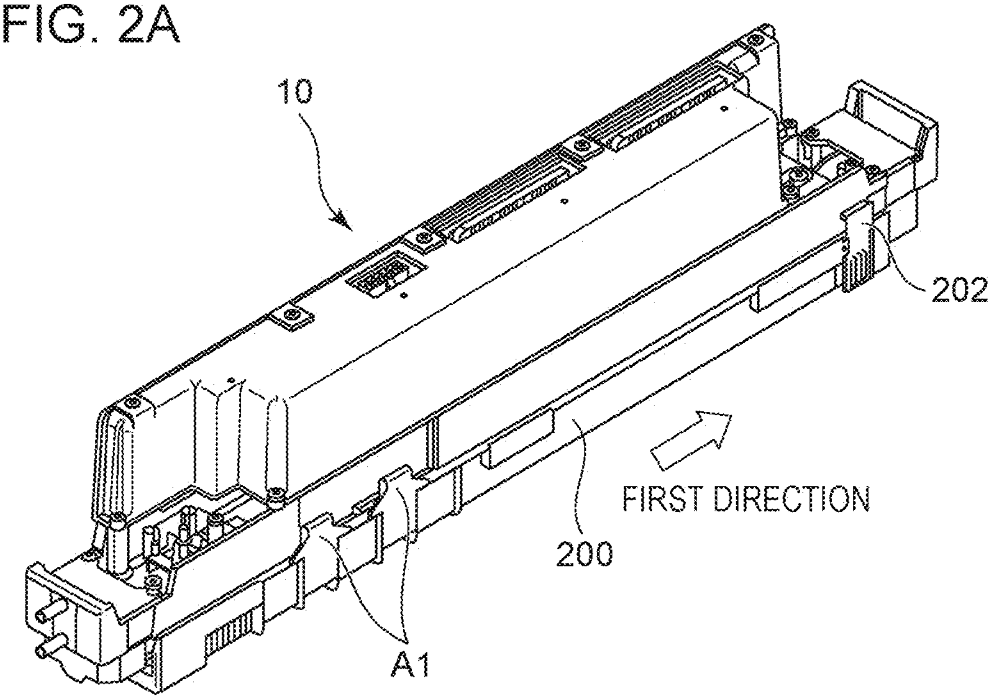
FIG. 2A is a perspective view of a liquid ejection head, with a cover member attached thereto.
Figure 2B:
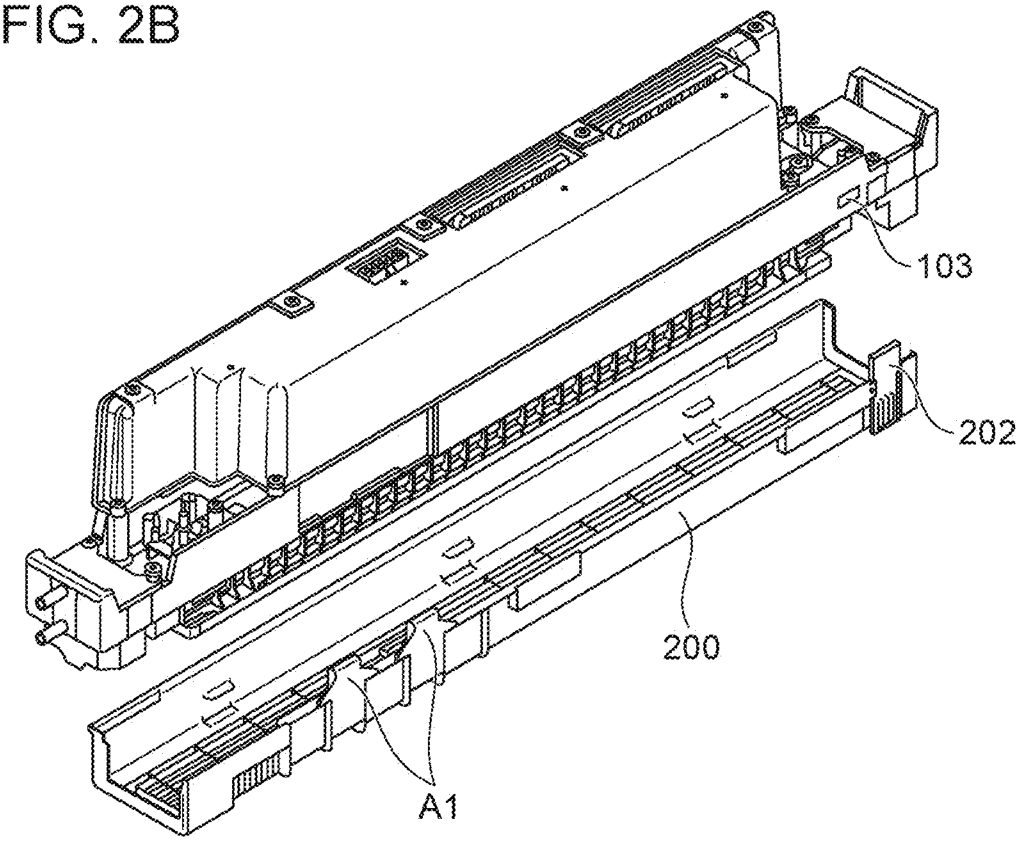
FIG. 2B is a perspective view of the liquid ejection head, with the cover member detached therefrom.

As illustrated in FIG. 2A and FIG. 2B, the cover member 200 is detachably attached to the liquid ejection head 10. For attachment and detachment of the cover member 200, the liquid ejection head 10 includes two guide portions B2 and two guide opening portions C2 (see FIG. 1) along the first direction. The liquid ejection head 10 also includes two guide portions B1 and two guide opening portions C1 (see FIG. 6B) in the first direction on the side opposite the side illustrated in FIG. 1. The cover member 200 includes the engaging portions A1 and A2 (see FIG. 3) configured to engage with the guide portions B1 and B2, respectively, of the liquid ejection head 10. The liquid ejection head 10 includes a securing opening portion 103 (see FIG. 2B) for securing the cover member 200. Although the liquid ejection head 10 includes two guide portions and two guide opening portions on each side thereof in the present embodiment, the present disclosure is not limited to this. The liquid ejection head 10 can include one guide portion and one guide opening portion on each side thereof, or can include more than two guide portions and more than two guide opening portions on each side thereof.

In the configuration for attachment and detachment, the guide portions B1 of the liquid ejection head 10 each have a contact portion with which the engaging portion A1 of the cover member 200 comes into contact, at one end in the first direction. When the liquid ejection head 10 and the cover member 200 are secured, the other end of the engaging portion A1 opposite the one end in the first direction is connected to the guide opening portion C1 of the liquid ejection head 10.

(Cover Member)

By being attached to the liquid ejection head 10, the cover member 200 functions to reduce damage to and contamination of the ejection element substrates and others during transport of the liquid ejection head or when the liquid ejection head is attached to or detached from the apparatus.

When the liquid ejection head 10 is attached to the apparatus, with the cover member 200 attached thereto, and the cover member 200 is detached from the liquid ejection head 10 thereafter, damage to and contamination of the liquid ejection head 10 during replacement work can be reduced.

Figure 3:
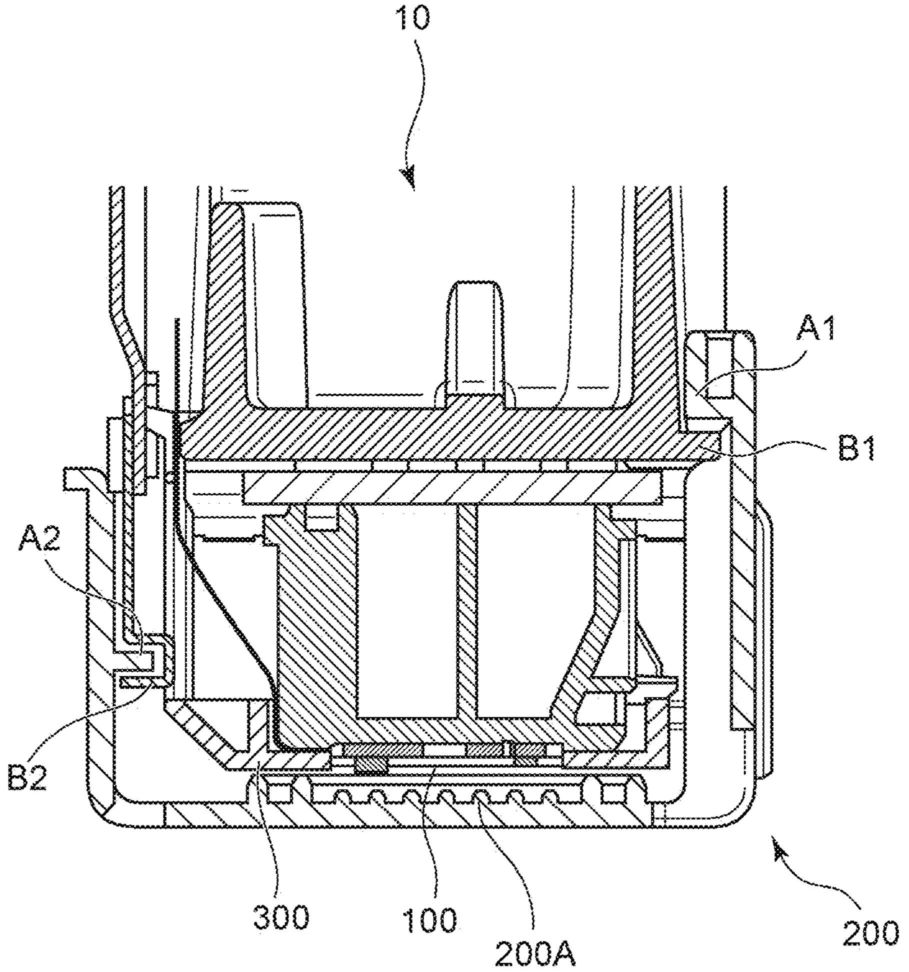
FIG. 3 is a schematic cross-sectional view of the liquid ejection head.
Figure 4:
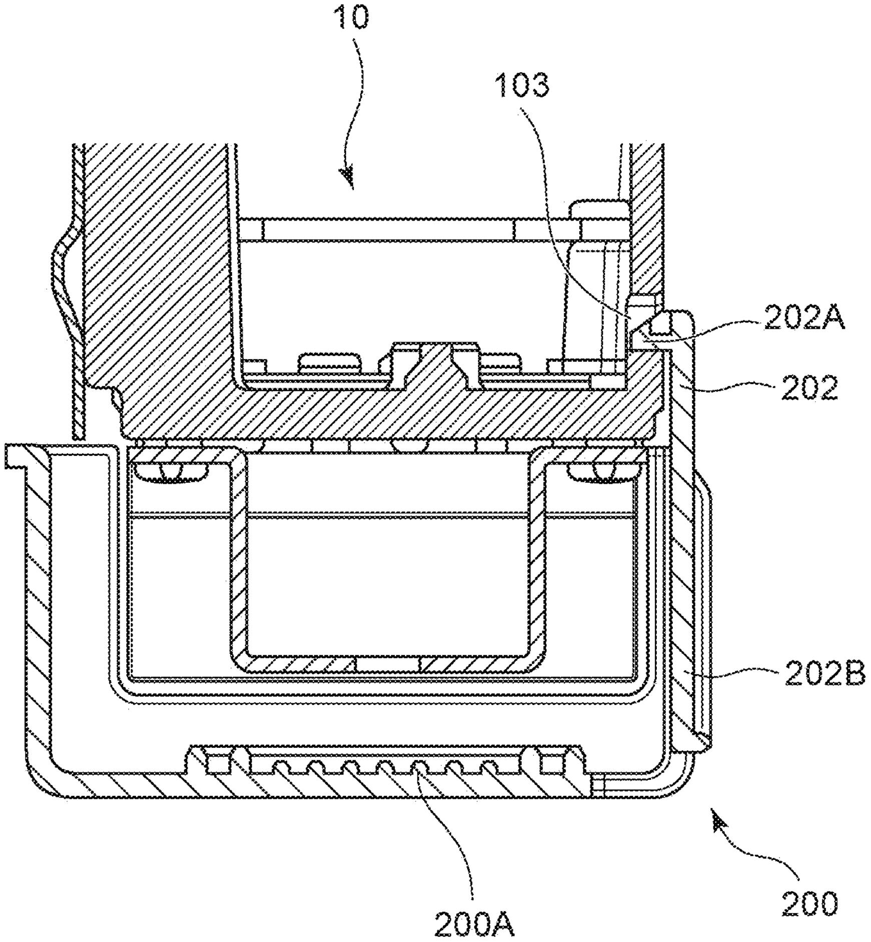
FIG. 4 is another schematic cross-sectional view of the liquid ejection head.

As illustrated in FIG. 3, the cover member 200 includes a cover portion 200A configured to cover the ejection element substrates 100 of the liquid ejection head 10. The cover member 200 includes the engaging portions A1 and A2 that can engage with the guide portions B1 and B2 of the liquid ejection head 10 and are shorter than the guide opening portions C1 and C2 in the first direction. In the engagement position where the guide portions B1 and B2 of the liquid ejection head 10 engage with the engaging portions A1 and A2, the cover member 200 engages in the securing opening portion 103 (see FIG. 4) of the liquid ejection head 10. In the engagement position where the guide portions B1 and B2 of the liquid ejection head 10 engage with the engaging portions A1 and A2, the movement of the cover member 200 in the first direction, with respect to the liquid ejection head 10, is restricted. The cover member 200 includes at least one securing portion 202 (see FIG. 4) configured to secure the cover member 200 to the liquid ejection head 10.

In the present embodiment, the cover member 200 includes the engaging portions A1 and A2 and the securing portion 202 (see FIG. 4) extending in a third direction (Z direction) crossing the first direction (X direction) and a second direction (Y direction). In the present embodiment, a direction crossing the first direction in a plane is referred to as a third direction, and a vertical direction is referred to as a second direction.

Figure 5:
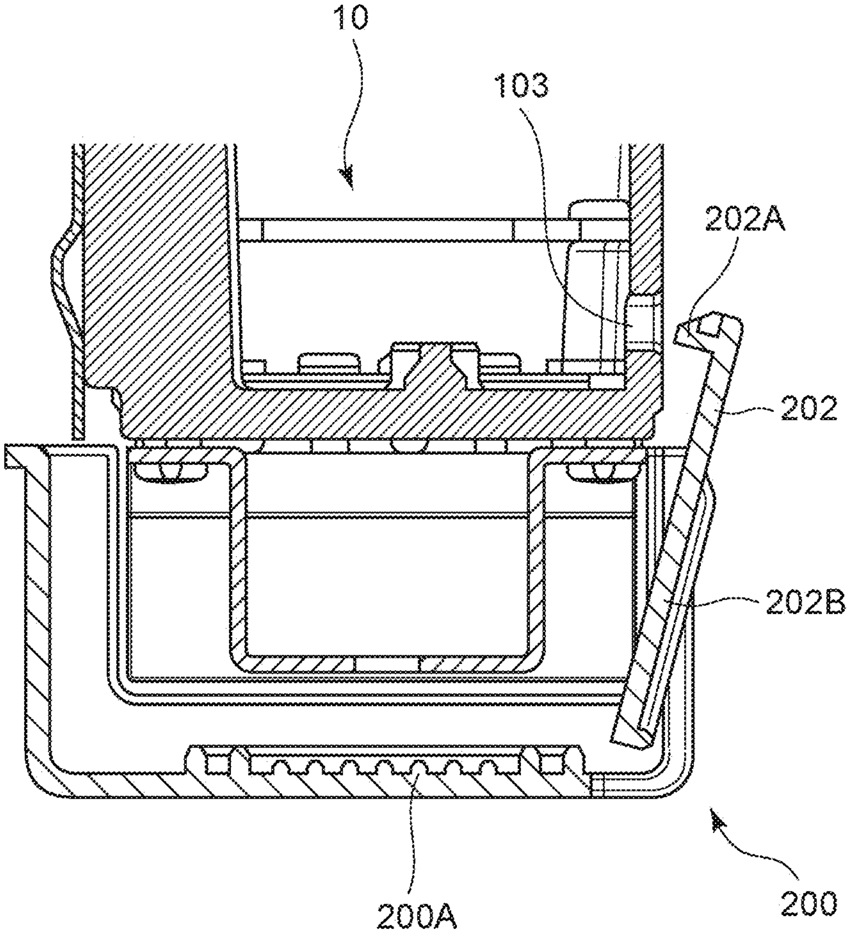
FIG. 5 is another schematic cross-sectional view of the liquid ejection head.

The securing portion 202 (see FIG. 4) has a deformable shape. The securing portion 202 can move from one position (or position illustrated in FIG. 4) where the securing portion 202 engages with the securing opening portion 103 to secure the cover member 200 to the liquid ejection head 10, to another position (or position illustrated in FIG. 5) where the cover member 200 is released from the secured state. In the present embodiment, the securing portion 202 includes a protrusion 202A (see, e.g., FIG. 4) on the upper side and a disengaging portion 202B (see, e.g., FIG. 4) on the lower side, and is attached to be turnable (swingable) in the second direction. The securing portion 202 is formed integrally with the cover member 200 and supported by a rotation shaft 202C (see, e.g., FIG. 6A). The securing portion 202 can be formed by a resin member, such as a polypropylene member. Although the securing portion 202 is formed integrally with the cover member 200 in the present embodiment, the configuration is not limited to this. The securing portion 202 can be formed as a component separate from the cover member 200.

In this case, for example, the securing portion 202 can be made of resin containing a filler or can be made of metal. The securing portion can have any shape that allows the cover member to be secured to the liquid ejection head. The securing portion can be formed by an extensible member with a protrusion at an end thereof, which engages in the securing opening portion 103 of the liquid ejection head and secures the cover member to the liquid ejection head.

The cover member 200 is attached to the liquid ejection head 10 (see FIG. 4) when the engaging portion A1 and the engaging portion A2 engage with the guide portion B1 and the guide portion B2, respectively (see FIG. 3), and the securing portion 202 is secured to the securing opening portion 103. Although the securing opening portion 103 and the securing portion 202 are formed at respective ends of the liquid ejection head 10 and the cover member 200 in the present embodiment, the configuration is not limited to this. The securing portion 202 and the securing opening portion 103 can be located at any positions as long as they can be engaged and released. Although the configuration with the cover member 200 that protects the ejection element substrates 100 has been described in the present embodiment, a configuration without the cover member 200 can be used.

(Method of Detaching Cover Member)

A method of detaching the cover member 200 from the liquid ejection head 10 will now be described.

Figure 6A:
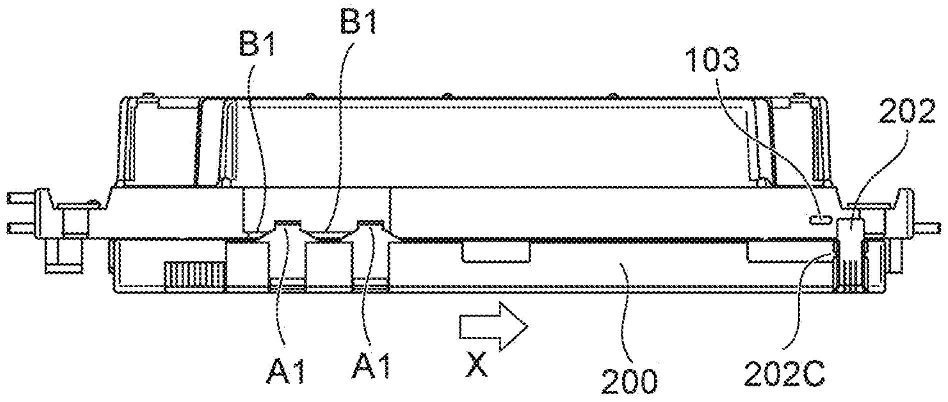
FIG. 6A is a schematic view illustrating a step of moving the cover member in a first direction.
Figure 6B:
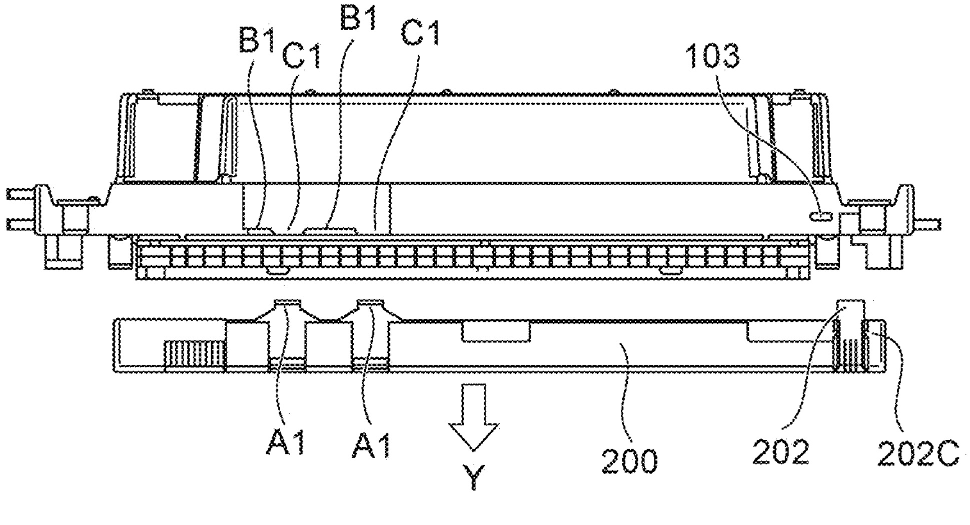
FIG. 6B is a schematic view illustrating a step of moving the cover member in a second direction.

FIG. 6A and FIG. 6B illustrate a process of detaching the cover member 200 from the liquid ejection head 10 according to the embodiment of the present disclosure. To detach the cover member 200 from the liquid ejection head 10, the disengaging portion 202B (see FIG. 5) of the securing portion 202 is pressed and moved (turned) to move (turn) the protrusion 202A. Moving (turning) the protrusion 202A releases the engagement of the securing opening portion 103 and the protrusion 202A. This allows the cover member 200 to move in the first direction as illustrated in FIG. 6A.

Next, the securing portion 202 is released from the securing opening portion 103 by a user operation. Then, as illustrated in FIG. 6A, the cover member 200 is moved from the engagement position in the first direction by a predetermined amount to release the engagement of the guide portions B1 and the engaging portions A1. The engaging portions A1 are thus moved to the positions of the guide opening portions C1. Then, by moving the cover member 200 in the second direction crossing the first direction as illustrated in FIG. 6B, the cover member 200 is detached from the liquid ejection head 10.

(Liquid Ejection Apparatus)

Figure 7:
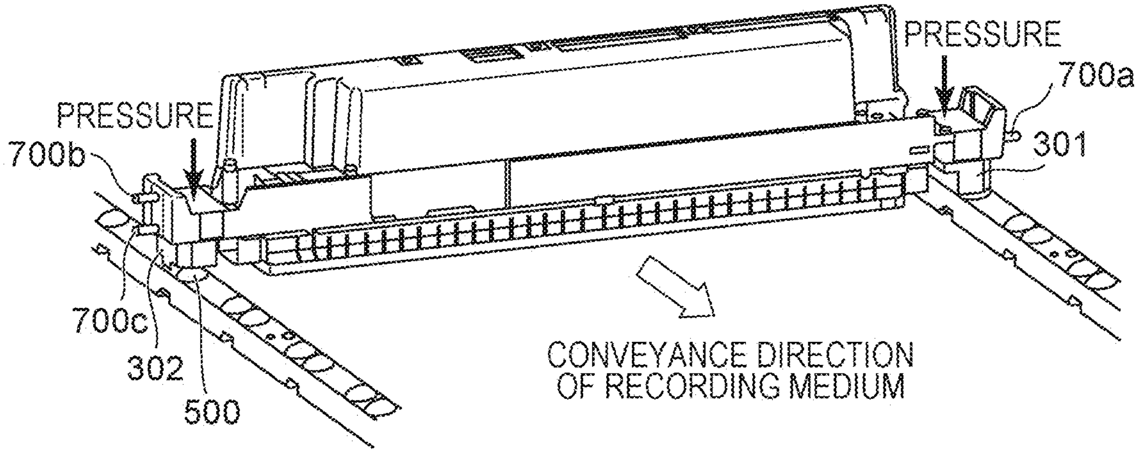
FIG. 7 is a schematic perspective view of the liquid ejection head mounted on a liquid ejection apparatus.

FIG. 7 is a schematic perspective view of the liquid ejection head 10 mounted on a liquid ejection apparatus according to the present embodiment.

The liquid ejection apparatus includes a frame, spherical portions 500 for positioning the liquid ejection head 10, and holders (not illustrated) configured to hold the protrusions 700*a*, 700*b*, and 700*c* of the liquid ejection head 10. The liquid ejection head 10 is configured to be attachable to and detachable from the liquid ejection apparatus. When the liquid ejection head 10 is attached to the liquid ejection apparatus, the protrusions 700*a*, 700*b*, and 700*c* are held by the respective holders of the liquid ejection apparatus. The liquid ejection head 10 is lowered onto the spherical portions 500, and the first positioning member 301 and the second positioning member 302 of the liquid ejection head 10 are positioned and held by the spherical portions 500.

The liquid ejection head 10 according to the present embodiment performs recording by ejecting liquid from the ejection element substrates 100 onto a recording medium conveyed from the upstream side in the conveyance direction.

Figure 8:
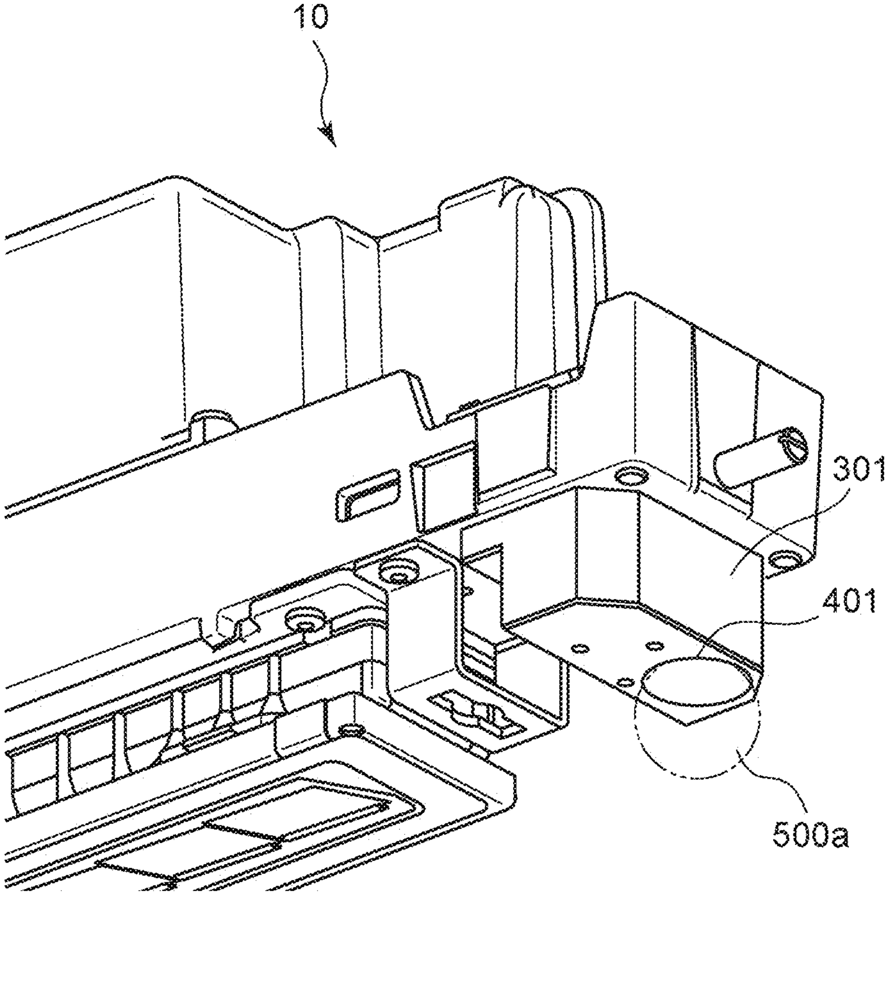
FIG. 8 is a partially enlarged view illustrating one end of the liquid ejection head in a longitudinal direction.
Figure 9:
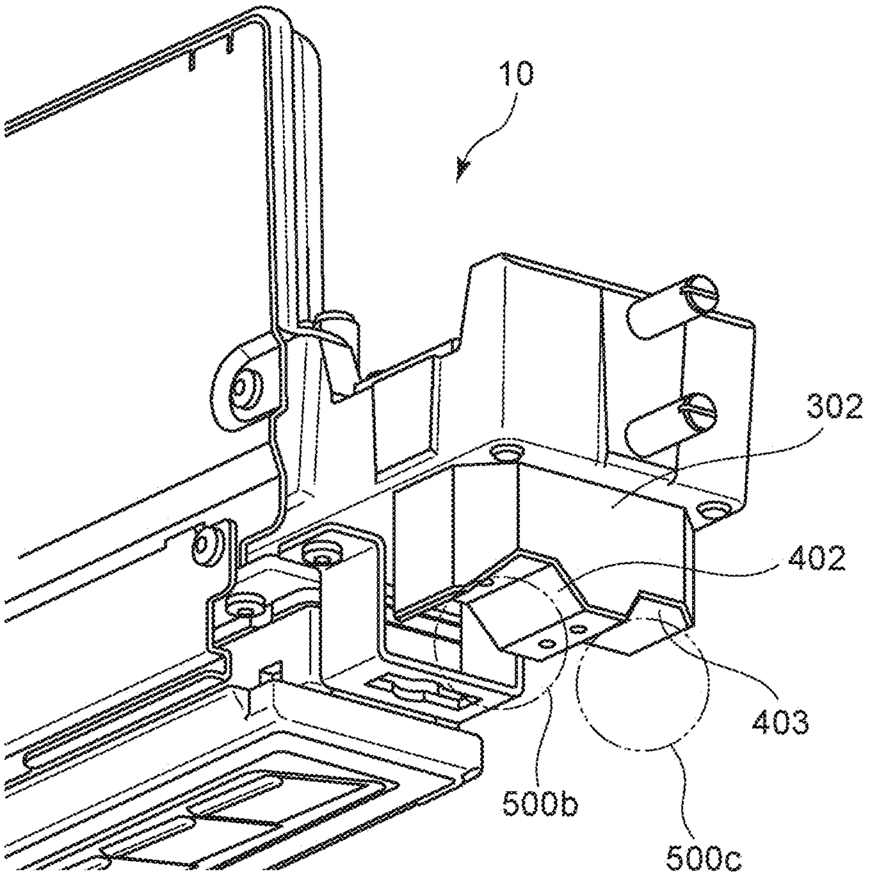
FIG. 9 is a partially enlarged view illustrating the other end of the liquid ejection head.

FIG. 8 is a partially enlarged view illustrating one end of the liquid ejection head 10 according to the present embodiment, and FIG. 9 is a partially enlarged view illustrating the other end of the liquid ejection head 10 according to the present embodiment. The first positioning member 301 of the liquid ejection head 10 has a conical recess 401 that opens downward in the vertical direction. The recess 401 engages with a spherical portion 500*a*, with the center of the conical shape aligned with the center of the spherical portion 500*a*. This can restrict the freedom of translation of the one end of the liquid ejection head 10 in three directions. As illustrated in FIG. 9, the second positioning member 302 of the liquid ejection head 10 has two tapered recesses 402 and 403. By coming into contact with a spherical portion 500*b*, the recess 402 restricts the freedom of rotation about a normal to the surface constituting the ejection element substrates 100 (rotation about the Z axis) and the freedom of rotation about the longitudinal direction of the liquid ejection (rotation about the X axis). By engaging with a spherical portion 500*c*, the recess 403 of the second positioning member 302 restricts the freedom of rotation about a normal to the longitudinal direction of the liquid ejection head 10 (rotation about the Y axis).

The one end and the other end of the liquid ejection head 10 can thus be secured in place by engagement with the spherical portions.

Figure 10A:
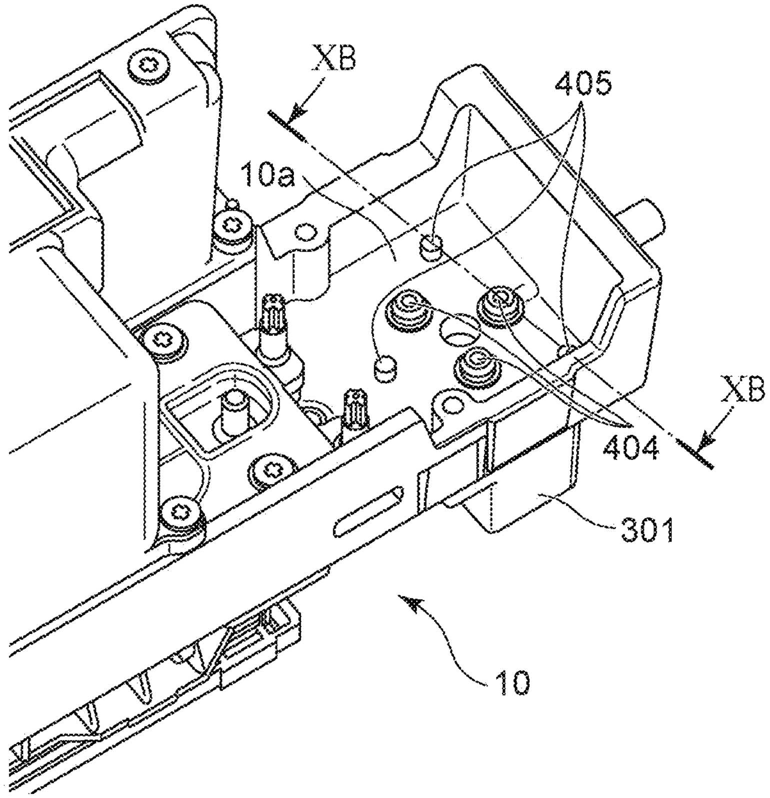
FIG. 10A is a perspective view of the one end of the liquid ejection head as seen from above.
Figure 10B:
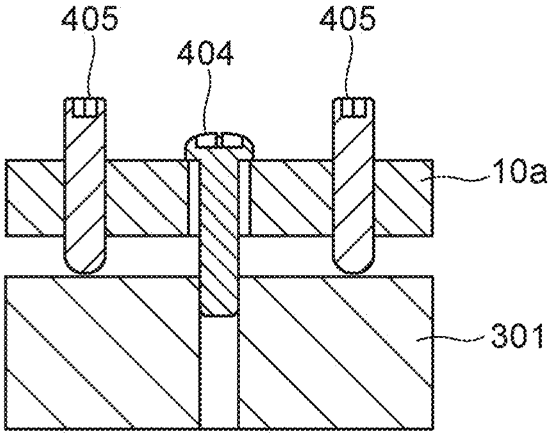
FIG. 10B is a schematic cross-sectional view of the liquid ejection head.

FIG. 10A is a perspective view of the one end of the liquid ejection head 10 according to the present embodiment as seen from above, and FIG. 10B is a schematic cross-sectional view taken along line XB-XB of FIG. 10A. The first positioning member 301 is secured in place with respect to the ejection element substrates. When the first positioning member 301 is to be secured with fastening screws 404 as in the present embodiment, the movement in the Z direction is to be restricted.

Accordingly, as illustrated in FIG. 10A, the one end of the liquid ejection head 10 has three fastening screws 404 for securing a liquid ejection head body 10*a* and the first positioning member 301, and three adjusting screws 405 for adjusting the height of the liquid ejection head 10 in the Z direction. The movement of the liquid ejection head 10 in the X direction and the Y direction can be restricted by screwing the liquid ejection head body 10*a* to the first positioning member 301. The movement of the liquid ejection head 10 in the Z direction can be restricted by adjusting the adjusting screws 405. Screwing thus enables high-precision mounting.

(Packaging of Liquid Ejection Head)

Figure 11:
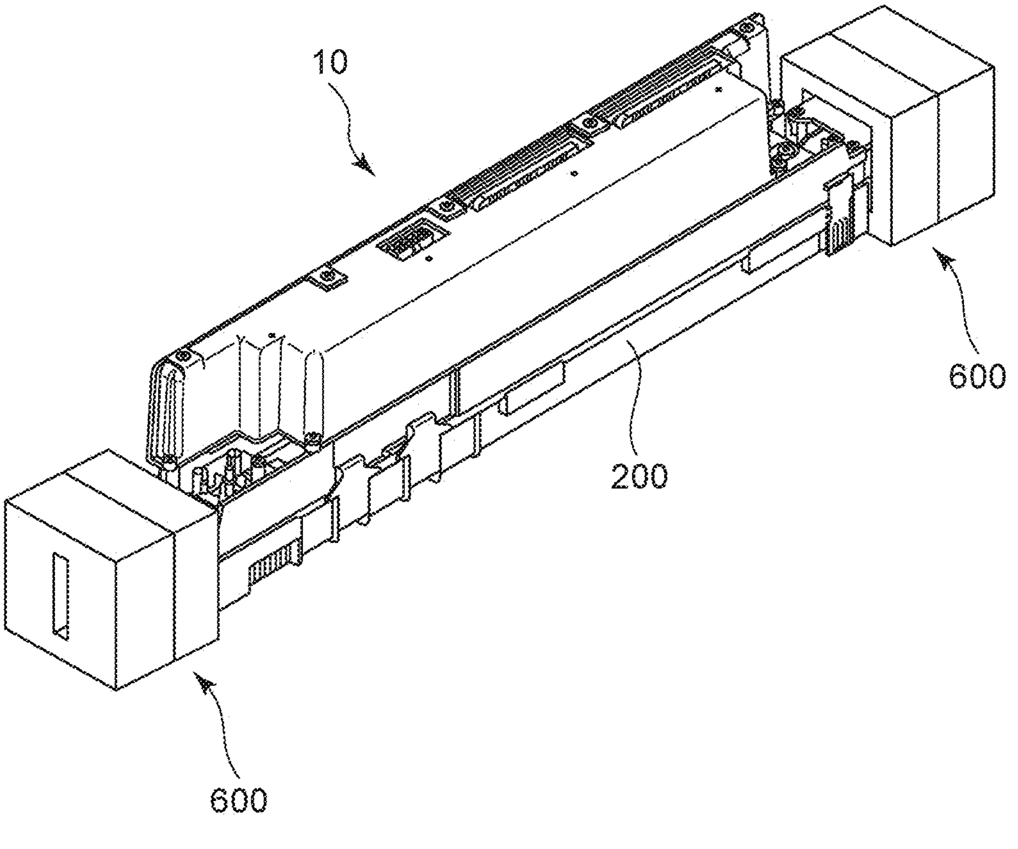
FIG. 11 is a perspective view of the liquid ejection head, with protective members attached to both ends thereof.
Figure 12:
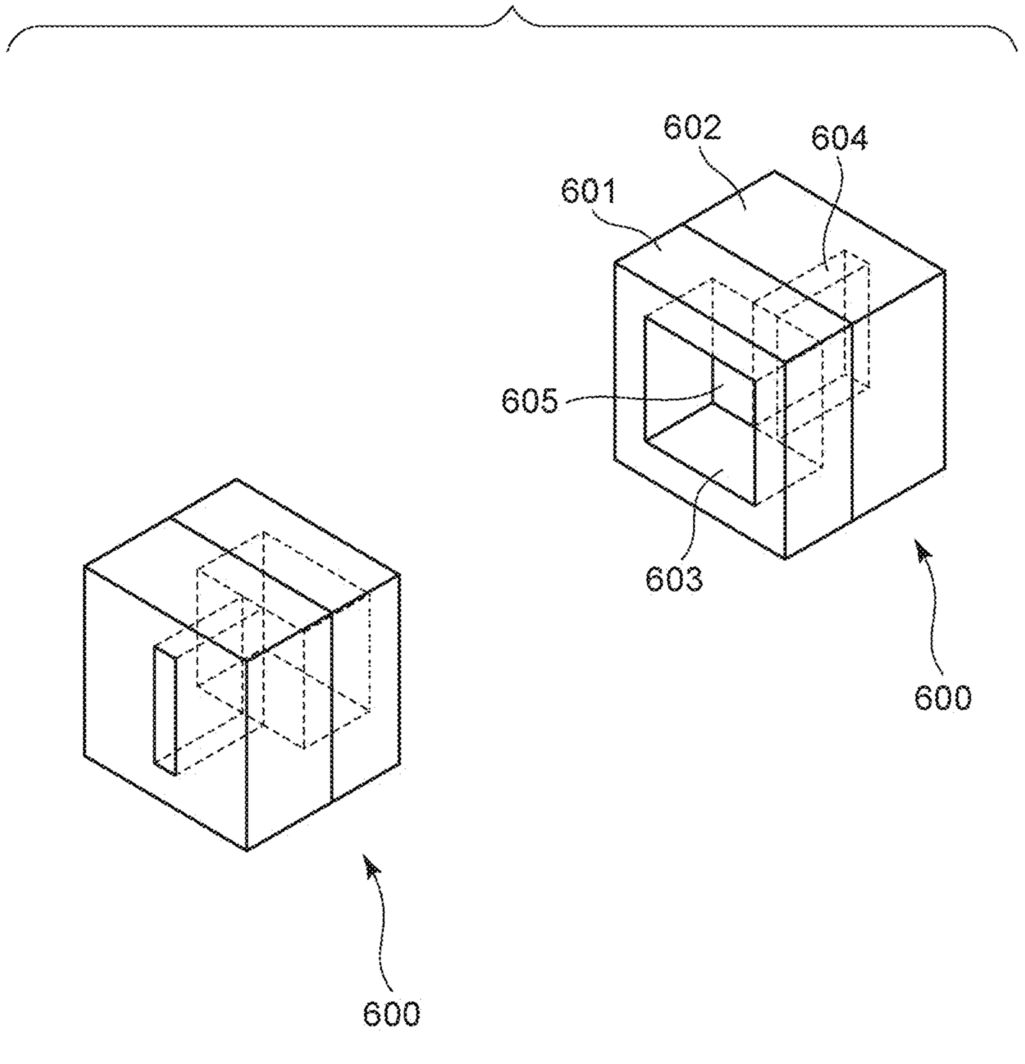
FIG. 12 is a see-through perspective view of the protective members.

FIG. 11 is a perspective view of the liquid ejection head 10 according to the embodiment of the present disclosure, with protective members 600 attached to the one end and the other end of the liquid ejection head 10. FIG. 12 is a see-through perspective view of the protective members 600.

In the present embodiment, as described above, the liquid ejection head 10 is placed in a bag member 800 to form a package. The cover member 200 is attached to the liquid ejection head 10. The protective members 600 are attached to both ends of the liquid ejection head 10 in the longitudinal direction, so that the cover member 200 is sandwiched therebetween and detachment of the cover member 200 is restricted. That is, the protective members 600 are configured to protect both ends of the liquid ejection head 10 and secure the cover member 200 to the liquid ejection head by sandwiching the cover member 200 therebetween. As illustrated in FIG. 12, each protective member 600 is formed by thermally welding a first member 601 and a second member 602. The protective member 600 does not need to be formed by thermally welding the first member 601 and the second member 602, and the first member 601 and the second member 602 can be integrated. The first member 601 has a first through hole 603 with a shape corresponding to the shape of the one end of the liquid ejection head 10 and configured to accommodate the one end. The second member 602 has a second through hole 604 that corresponds to the shape of the protrusion 700*a* protruding from the one end of the liquid ejection head 10 and can accommodate the protrusion. The second member 602 has a contact surface 605 facing the first through hole 603. The contact surface 605 is a surface with which a surface of the liquid ejection head 10 having the protrusion received in the first through hole 603 comes into contact. The surface of the liquid ejection head having the protrusion thereon is in contact with the contact surface, so that the protrusion is accommodated in the through hole. This can reduce the possibility that the protrusion will pierce through the protective member 600.

For example, the protective member 600 can be made of a foam material primarily composed of polyethylene. The first member 601 and the second member 602 can thus be thermally welded to form the protective member 600. Although the protective member 600 formed by joining the first member 601 and the second member 602 is used in the present embodiment, a protective member integrally formed and having the through holes described above can be used.

Figure 13A:
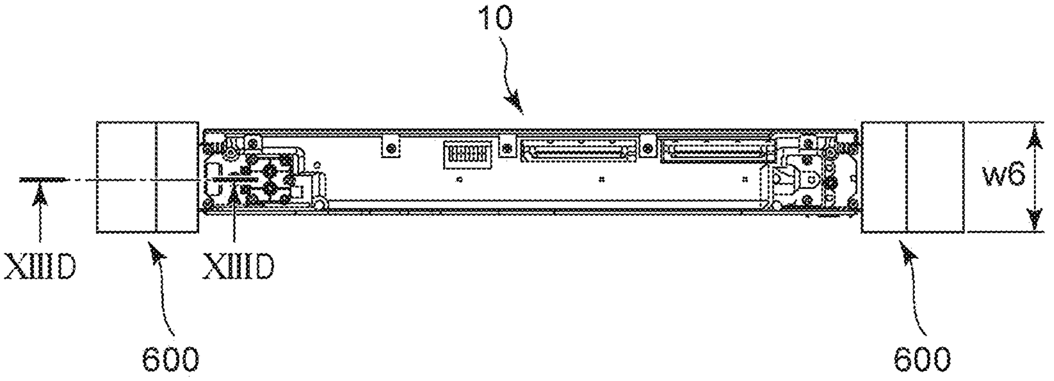
FIG. 13A is a top view of the liquid ejection head, with the protective members attached to both ends thereof.
Figure 13B:
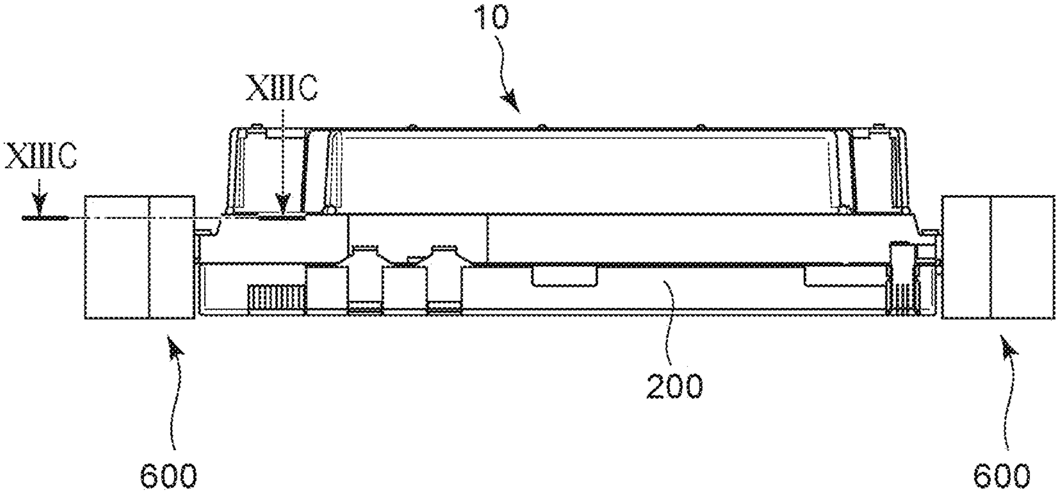
FIG. 13B is a lateral view of the liquid ejection head, with the protective members attached to both ends thereof.
Figure 13C:
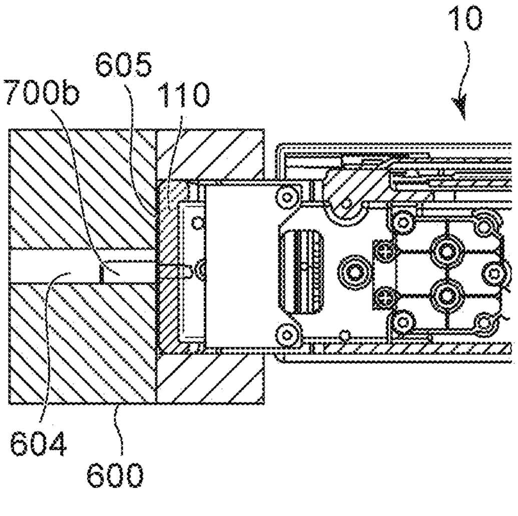
FIG. 13C is a cross-sectional view of the liquid ejection head, with the protective members attached to both ends thereof.
Figure 13D:
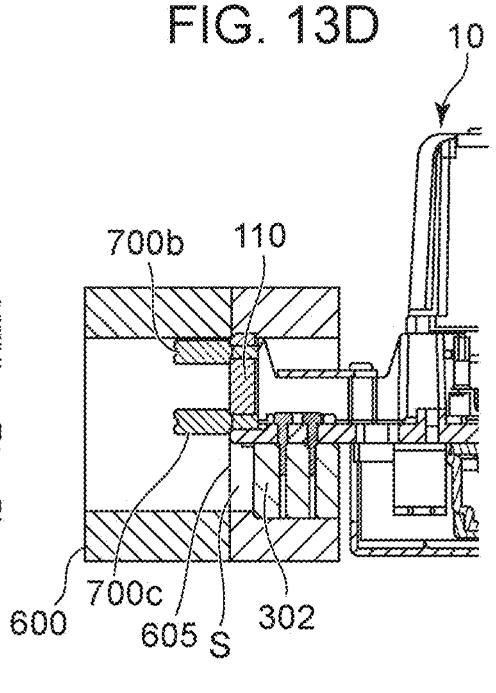
FIG. 13D is another cross-sectional view of the liquid ejection head, with the protective members attached to both ends thereof.

FIG. 13A is a top view of the liquid ejection head 10 according to the present embodiment, with the protective members 600 attached to both the one end and the other end thereof. FIG. 13B is a lateral view of FIG. 13A. FIG. 13C is a cross-sectional view taken along line XIIIC-XIIIC of FIG. 13B, and FIG. 13D is a cross-sectional view taken along line XIIID-XIIID of FIG. 13A.

The protective members 600 are attached to both ends of the liquid ejection head 10 in such a way as to restrict movement of the cover member 200 attached to the liquid ejection head 10. That is, as illustrated in FIG. 13B, the protective members 600 are located near the respective ends of the cover member 200 in the longitudinal direction. As illustrated in FIG. 13A to FIG. 13D, in directions orthogonal to the longitudinal direction of the cover member 200, the range of the protective members 600 is greater than the range of the cover member 200. Therefore, even if some external force acts on the liquid ejection head 10 with the cover member 200 attached thereto, the external force is absorbed by the protective members 600 and can be prevented from directly acting on the cover member 200. For example, even if the liquid ejection head 10 drops, the impact can be absorbed by the protective members 600 and can be prevented from directly acting on the cover member 200. At the same time, even if the cover member 200 is to come off the liquid ejection head 10, the movement of the cover member 200 is restricted by the protective members 600 near the cover member 200. The protrusions 700*a* and 700*b* protruding from the ends of the liquid ejection head 10 are housed in the protective members 600. Therefore, even if the liquid ejection head 10 is subjected to impact, such as a drop impact, the possibility that the protrusions of the liquid ejection head 10 will damage a storage bag can be reduced.

In addition to the impact absorbing function of the protective members 600, the present embodiment provides the following impact absorbing structure. In the present embodiment, as illustrated in FIG. 13D, the second positioning member 302 and the contact surface 605 of the protective member 600 have a space S therebetween. Therefore, even in the case of an accidental drop in the longitudinal direction, the impact on a component 110 of the liquid ejection head is reduced by the protective member. Since the positioning member does not come into contact with the protective member, it is possible to reduce the possibility that the mounting accuracy will be affected.

As illustrated in FIG. 11 and FIGS. 13A to 13D, the protective members 600 are placed near both ends of the cover member 200 in the longitudinal direction. Then, as illustrated in FIGS. 14B and 14C, the protective members 600 are secured to the liquid ejection head 10 by reducing pressure in the bag member 800. This restricts the movement of the cover member 200 in the longitudinal direction, and the cover member 200 cannot be detached. Since the protective members 600 are configured to protect corners and protrusions at both ends of the liquid ejection head 10, the bag member can be prevented from being damaged by the corners and protrusions at both ends even if external force, such as vibration or drop impact, is applied during transport. Therefore, the reduced pressure in the bag member 800 is maintained and the cover member cannot be detached.

(Bag Member)

Figure 14A:
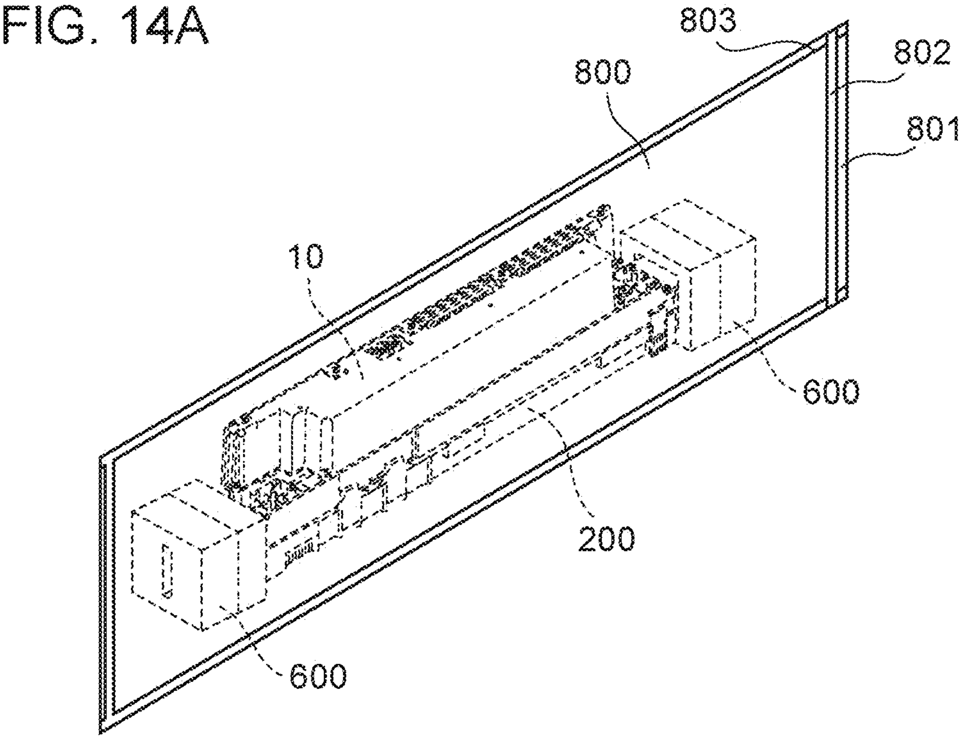
FIG. 14A is a perspective view of a bag member, with the liquid ejection head inserted therein.
Figure 14B:
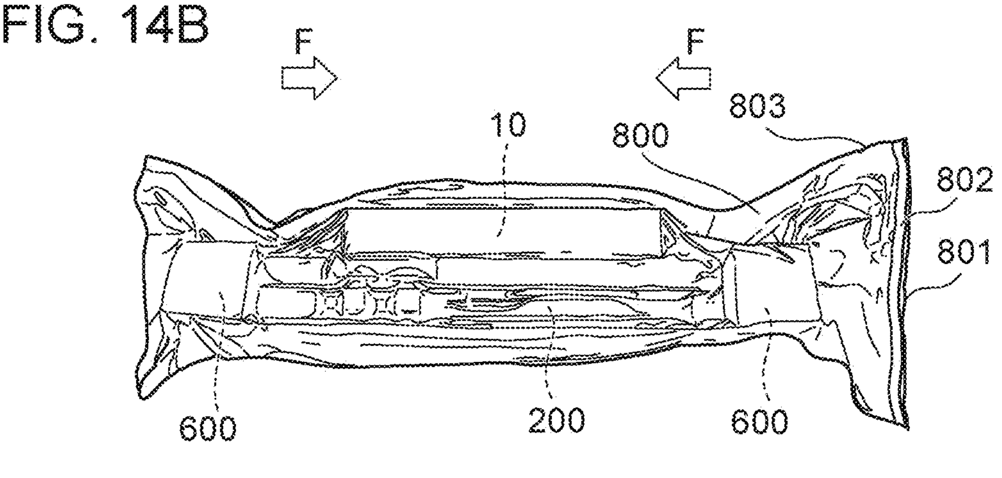
FIG. 14B is a perspective view illustrating a step of reducing pressure inside the bag member to seal the bag member.
Figure 14C:
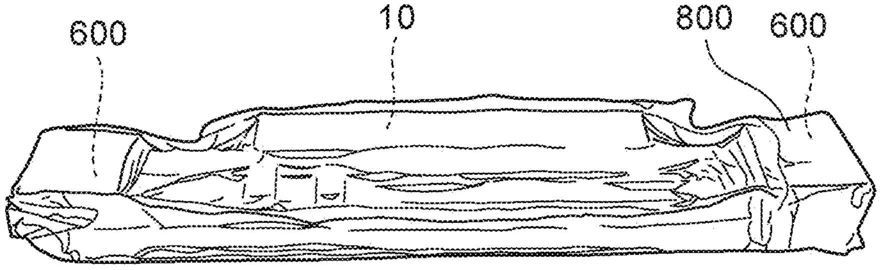
FIG. 14C is a perspective view of the bag member internally reduced in pressure and sealed.
Figure 15:
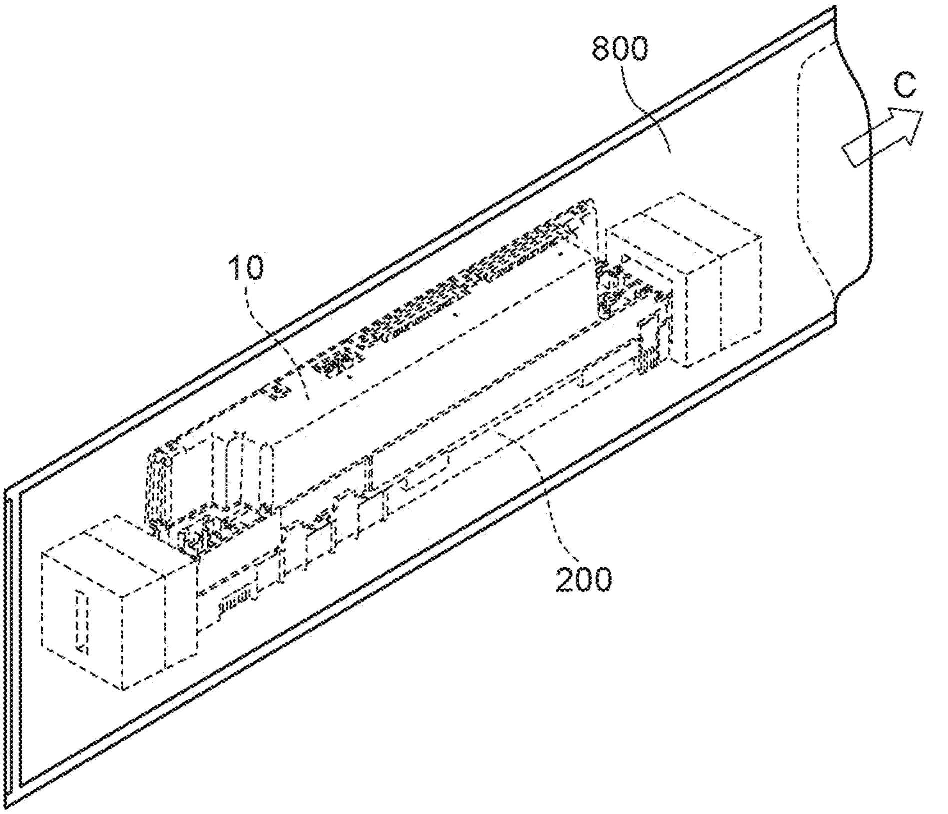
FIG. 15 is a perspective view of the liquid ejection head, with the bag member unsealed.

FIG. 14A is a perspective view of the bag member 800, with the liquid ejection head 10 inserted therein, FIG. 14B is a perspective view illustrating a step of reducing pressure inside the bag member 800 to seal the bag member 800, and FIG. 14C is a perspective view of the bag member 800 internally reduced in pressure and sealed. FIG. 15 is a perspective view of the liquid ejection head 10 according to the present embodiment, with the bag member 800 unsealed.

As illustrated in FIG. 14A, the liquid ejection head 10 according to the present embodiment is placed in the bag member 800, with the protective members 600 attached thereto. In the present embodiment, the bag member 800 is a three-side welded bag and has an opening 801. The liquid ejection head 10 is inserted through the opening 801 into the bag member 800. The pressure inside the bag member 800 is then reduced, and the opening 801 is thermally welded to form a thermally welded portion 802 and seal the bag member 800. As illustrated in FIG. 14B, reducing the pressure inside the bag member 800 reduces the space inside the bag member 800, and causes the bag member 800 to tightly adhere to the liquid ejection head 10 and the protective members 600. The protective members 600 are thus pressed against the liquid ejection head 10 and substantially secured in place. The protective members 600 are attached near both ends of the cover member 200 in the longitudinal direction. Therefore, by being secured in place, the protective members 600 restrict sliding movement of the cover member 200 in the longitudinal direction. The pressure inside the bag member 800 is reduced until the bag member 800 presses the protective members 600 against the liquid ejection head 10. By being pressed against the liquid ejection head 10 and substantially secured in place, the protective members 600 can further restrict the movement of the cover member 200 in the longitudinal direction.

Although the cover member 200 is engaged with the liquid ejection head 10 by the securing portion 202 (see FIG. 4), the engagement can be loosened, for example, by external force. In the present embodiment, even if engagement between the securing portion 202 of the cover member 200 and the securing opening portion 103 is loosened, the restriction by the protective members 600 on both ends of the cover member 200 can prevent the cover member 200 from falling off during transport. Since the protective members 600 have the second through holes 604 (see FIG. 12) in the longitudinal direction of the liquid ejection head 10, the pressure of air on the distal side of the bag member 800, opposite the opening 801, is also reduced. The pressure inside the bag member 800 can thus be reduced.

As illustrated in FIG. 14B, reducing pressure applies a force F to the protective members 600 at both ends of the liquid ejection head 10. When the pressure is reduced, the bag member 800 can easily adhere tightly to the liquid ejection head 10 and the cover member 200 without forming a large pressure-reduced space between the protective members 600 at both ends of the liquid ejection head 10, and the protective members 600 can be easily pressed against the liquid ejection head 10 and secured in place.

The bag member 800 has an unsealing portion for unsealing at an end thereof in the longitudinal direction. The unsealing portion is a notch 803 in the present embodiment. As illustrated in FIG. 14A, the notch 803 is located at an edge of the bag member 800 that moves in the direction in which the cover member 200 is secured to the liquid ejection head 10. The notch 803 is a cut from which to open the bag member 800, that is, the notch 803 assists in unsealing the bag member 800. After the bag member 800 is unsealed, the liquid ejection head 10 can be taken out of the bag member 800 by moving the liquid ejection head (see arrow C in FIG. 15). Specifically, the liquid ejection head 10 and the cover member 200 are both taken out along the first direction (arrow X) illustrated in FIG. 6A. The liquid ejection head can thus be taken out without causing the protective members to fall off. Therefore, the ejection element substrates 100 can be protected even when the liquid ejection head 10 is taken out of the bag member 800.

The bag member 800 can be a bag formed by laminated layers of, for example, oriented nylon, polyethylene, aluminum, polyethylene, and antistatic low-density polyethylene and having a total thickness of about 0.12 mm. The liquid ejection head is inserted into the bag member, with edges of metal components, such as the positioning members and the protrusions of the liquid ejection head, protected by the protective members. The bag member can thus be prevented from being pierced by friction caused, for example, by vibration during transport.

Although the liquid ejection head 10 is packed in the bag member in the present embodiment, the liquid ejection head package (described below) does not necessarily need to include the bag member.

(Box Unit)

The liquid ejection head package, which is a feature of the present embodiment, will now be described in detail. The liquid ejection head 10 is stored in a box member 901 during transport. A cushioning member and others for protecting the liquid ejection head 10 from external impact are also stored in the box member 901. The term "liquid ejection head package" according to the embodiment of the present disclosure refers to an assembly of the liquid ejection head and the box unit including the cushioning member and the box member 901.

Figure 16:
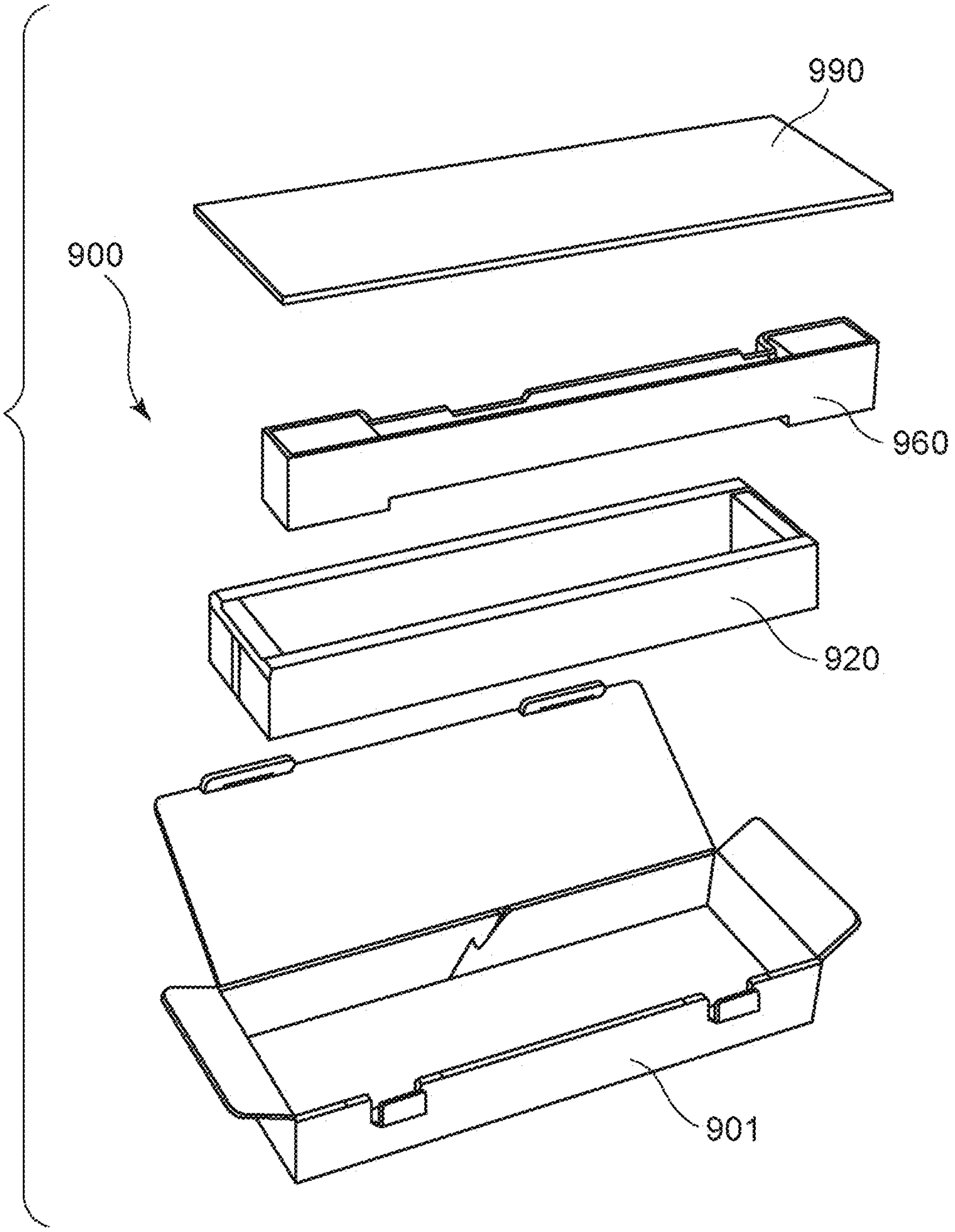
FIG. 16 is an exploded perspective view of a box unit.
Figure 17:
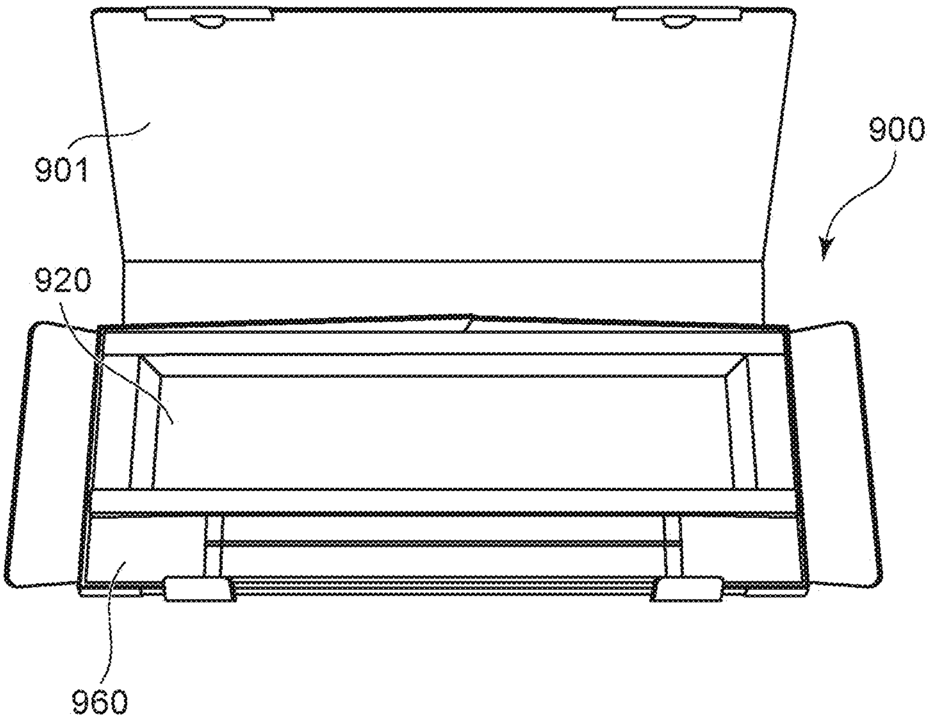
FIG. 17 is a schematic view of a box member and a cushioning member placed therein.

As illustrated in FIG. 16, a box unit 900 includes the box member 901, a cushioning member 920, a storage member 960 for storing a spare cover member 210, and a cushioning plate 990. The box member 901 is configured to include therein the cushioning member 920 and the storage member 960 as illustrated in FIG. 17. The components of the box unit according to the present embodiment do not need to be separate, and can be integrated. For example, the box member 901 and the cushioning member 920 can be formed integrally.

Figure 18:
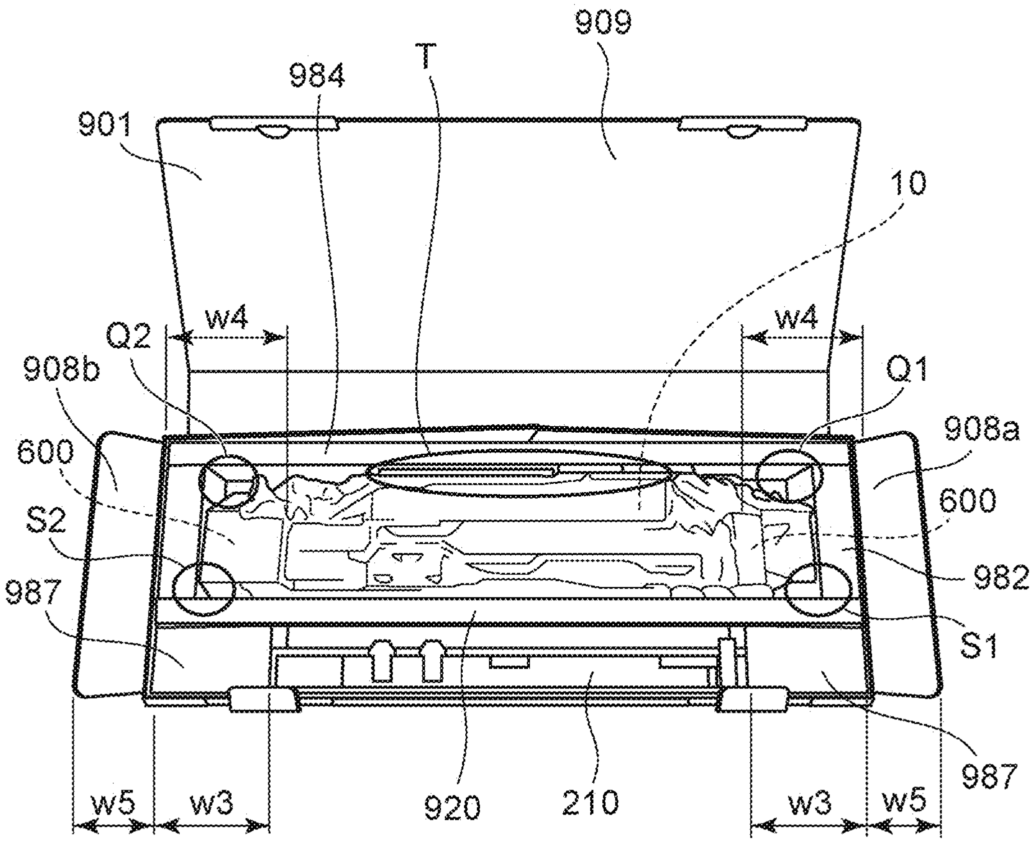
FIG. 18 is a schematic view of the box unit in which the liquid ejection head is placed in the box member.

As illustrated in FIG. 18, the liquid ejection head 10 can be packed in the box member 901 (cushioning member 920) in a lying state. Packing the liquid ejection head 10 in a lying state means that packing the liquid ejection head 10, with the ejection element substrates 100 facing the side surface of the box member 901.

The spare cover member 210 is also stored in the storage member 960 in a lying state.

Figure 19:
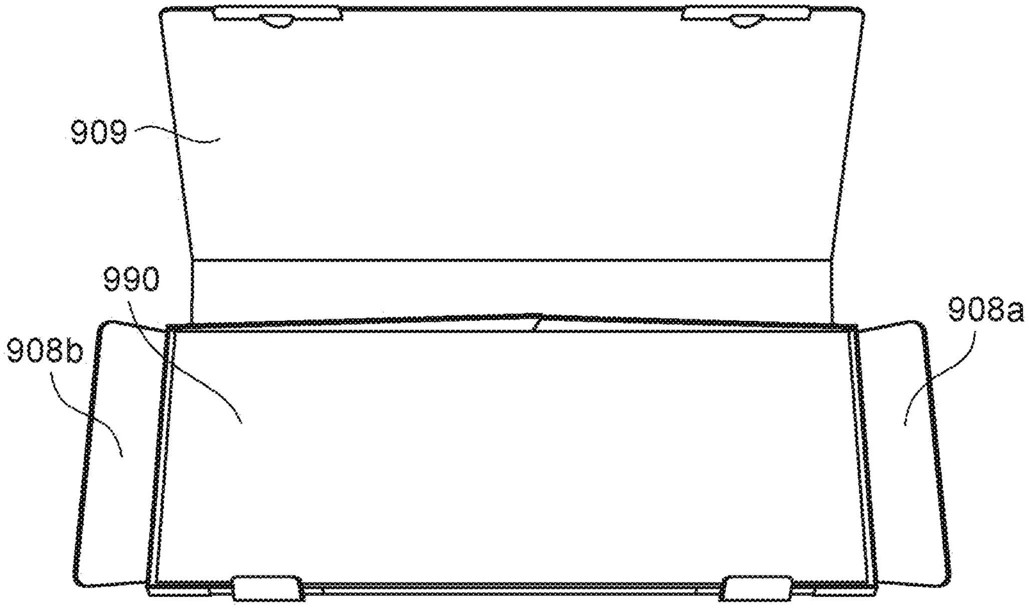
FIG. 19 is a schematic view of the box unit in which a cushioning plate is placed in the box member.
Figure 20:
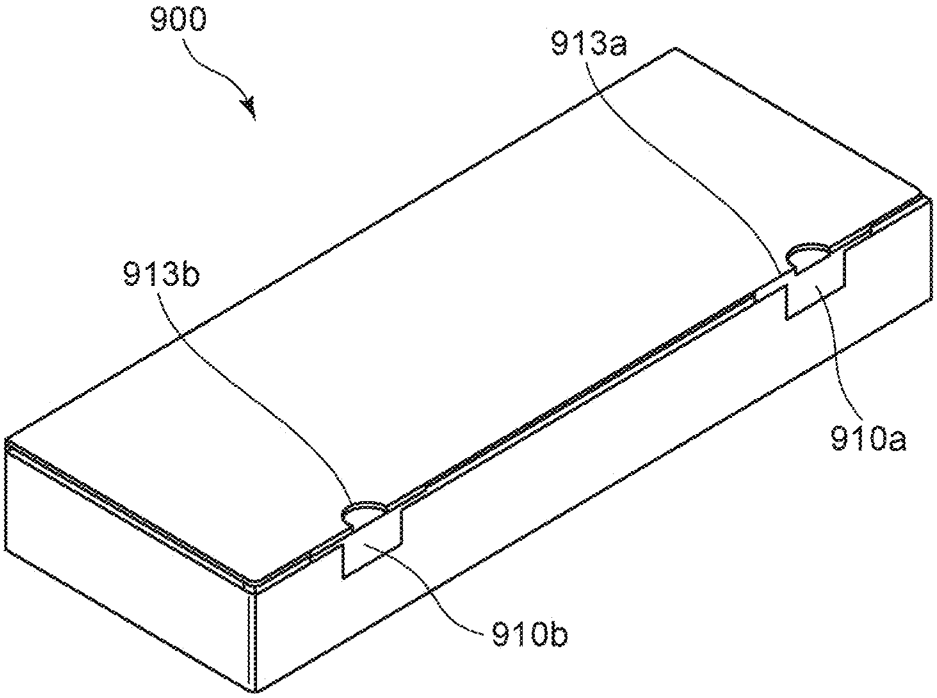
FIG. 20 is a perspective view of a liquid ejection head package.

As illustrated in FIG. 19, the cushioning plate 990 is placed at the top inside the box member 901 to cover the liquid ejection head 10 and the spare cover member 210. That is, when a lid 909 of the box member 901 is closed, the cushioning plate 990 is placed between the liquid ejection head 10 and the lid 909. After third flaps 908*a* and 908*b* of the box member are folded inward, the lid 909 for opening and closing the box member 901 is closed. Then, as illustrated in FIG. 20, lock portions 910*a* and 910*b* are inserted into third holes 913*a* and 913*b* in the lid 909 to complete the package. The packaging method of the box unit 900 is not limited to this, and any method can be used as long as the liquid ejection head inside the box unit 900 can be packed.

The shapes of and the methods for folding the box member 901, the cushioning member 920, and the storage member 960 constituting the box unit 900 will now be described in detail.

(Box Member)

Figure 21A:
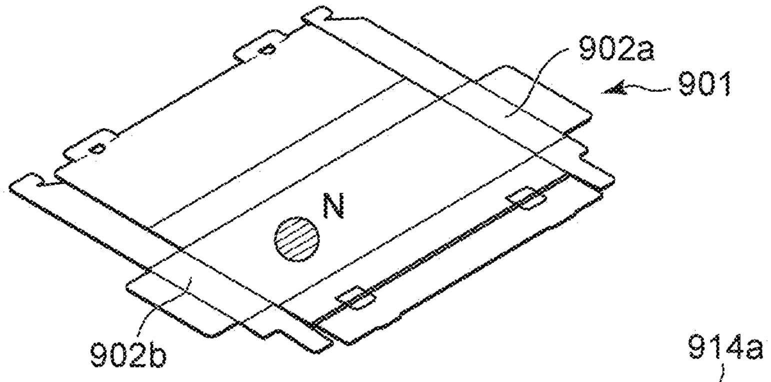
FIG. 21A is a developed view of the box member.

First, the box member 901 of the box unit 900 will be described. As illustrated in FIG. 21A, the box member 901 can be formed by a sheet of corrugated cardboard. The flutes of the corrugated cardboard on the surface of the box member 901 on which the liquid ejection head 10 is placed can run in the longitudinal direction of the box member as indicated by N in FIG. 21A. This can make the box member 901 resistant to impact in the longitudinal direction.

Figure 21B:
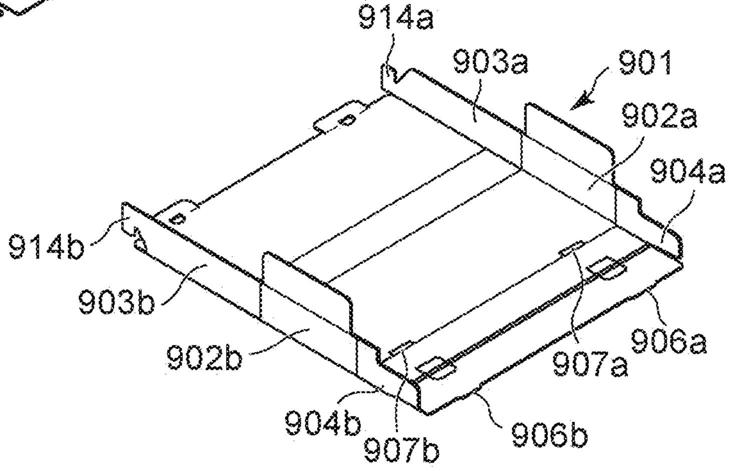
FIG. 21B is a perspective view illustrating a step of folding first side surfaces of the box member.
Figure 21C:
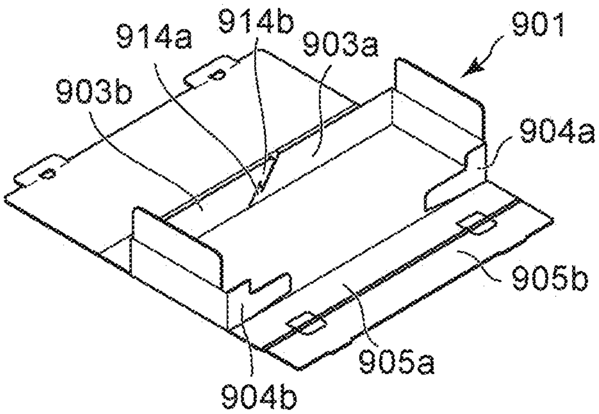
FIG. 21C is a perspective view illustrating a step of folding flaps of the box member.
Figure 21D:
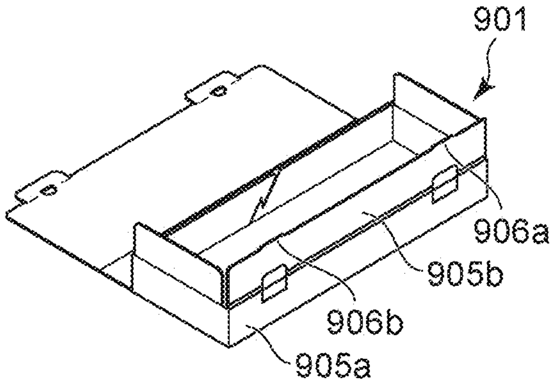
FIG. 21D is a perspective view illustrating a step of folding a second side surface of the box member.
Figure 21E:
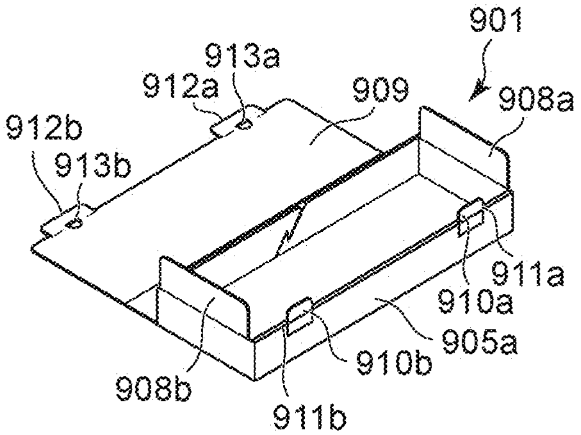
FIG. 21E is a perspective view illustrating a step of folding another second side surface, with the flaps of the box member tucked in between the second side surfaces.
Figure 21F:
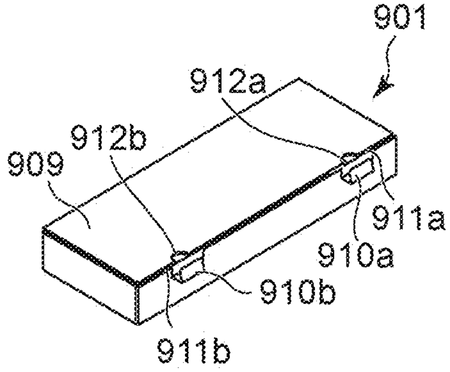
FIG. 21F is a perspective view illustrating a step of inserting first insertion portions into second holes.
Figure 21G:
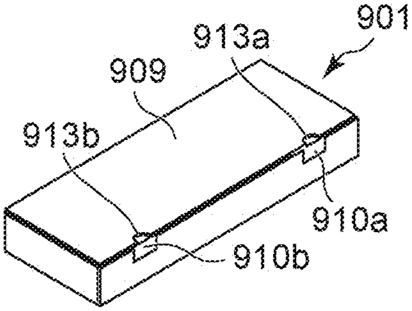
FIG. 21G is a perspective view illustrating a step of inserting lock portions into third holes.

The box member 901 is folded in the following manner. First, as illustrated in FIG. 21B, first side surfaces 902*a* and 902*b* are each folded upward along a line in the corrugated cardboard. Then, first flaps 903*a* and 903*b* and second flaps 904*a* and 904*b* are each folded along a line, as illustrated in FIG. 21C. The first side surfaces 902*a* and 902*b* can be kept upright by connecting engaging portions 914*a* and 914*b* at ends of the first flaps 903*a* and 903*b*. Then, as illustrated in FIG. 21D, a second side surface 905*a* is folded along a line, and as illustrated in FIG. 21E, a second side surface 905*b* is folded inward, with the second flaps 904*a* and 904*b* tucked in between the second side surfaces 905*a* and 905*b*. By inserting protrusions 906*a* and 906*b* into first holes 907*a* and 907*b* illustrated in FIG. 21B, the second side surface 905*a* can be kept upright to form a box shape. The lid 909 of the box member 901 has first insertion portions 912*a* and 912*b* and third holes 913*a* and 913*b*, and the second side surface 905*a* has second holes 911*a* and 911*b*. When the lid 909 is closed as illustrated in FIG. 21F, the first insertion portions 912*a* and 912*b* are inserted into the second holes 911*a* and 911*b*. Then, as illustrated in FIG. 21G, the lid 909 is secured by inserting the lock portions 910*a* and 910*b* of the second side surface into the third holes 913*a* and 913*b* in the lid. The liquid ejection head 10 can be packed in the box member of the present embodiment by the procedure described above. The box member 901 does not necessarily need to be configured as described above, and can have any form as long as the liquid ejection head can be packed therein.

(Cushioning Member)

Figure 22A:
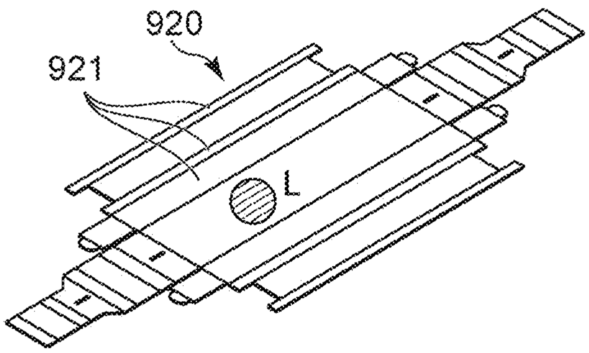
FIG. 22A is a developed view of the cushioning member.

The cushioning member 920 of the box unit 900 will now be described. As illustrated in FIG. 22A, the cushioning member 920 can also be made of corrugated cardboard. As in the case of the box member 901, the flutes of the corrugated cardboard can run in the longitudinal direction as indicated by L in FIG. 22A. This can make the cushioning member 920 resistant to impact in the longitudinal direction of the cushioning member 920. The cushioning member 920 can have less rigidity than the box member 901. This can improve the cushioning effect of the cushioning member 920 against impact applied to the box member 901.

Figure 22B:
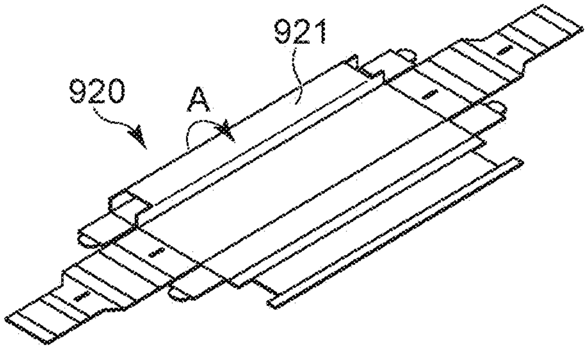
FIG. 22B is a perspective view illustrating a step of folding a side wall of the cushioning member.
Figure 22C:
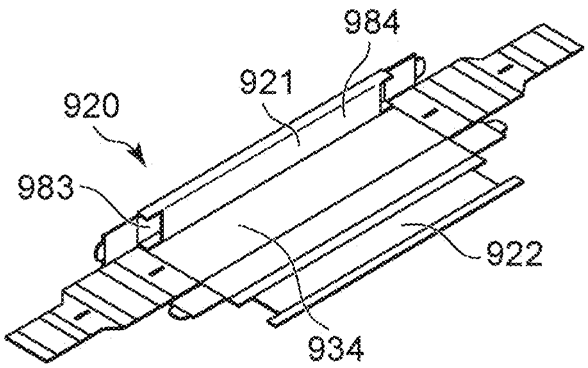
FIG. 22C is a perspective view illustrating a step of forming a second cushioning portion.
Figure 22D:
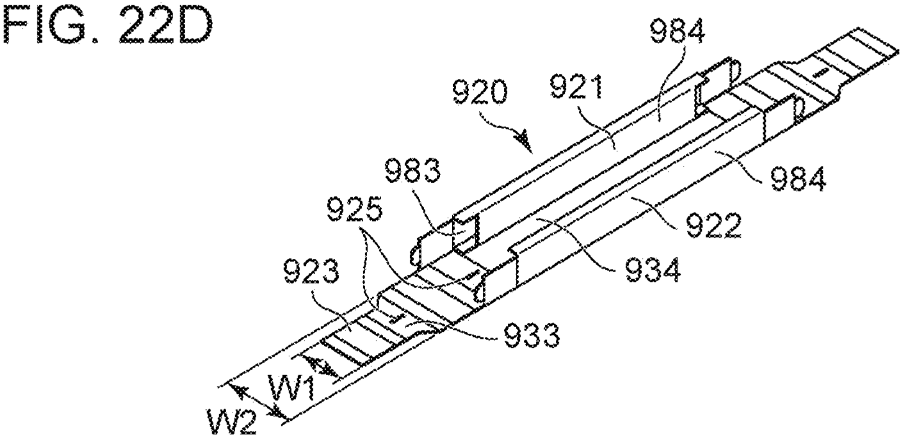
FIG. 22D is a perspective view illustrating a step of forming another second cushioning portion.

In the present embodiment, the method of folding the cushioning member 920 made of corrugated cardboard will be described. A first side wall 921 along the longitudinal direction is first folded inward along lines as indicated by arrow A in FIG. 22B. Thus, a second space 983 having the first side wall 921 as a side wall thereof is formed. Next, by raising the first side wall 921 perpendicular to a bottom surface 934 as illustrated in FIG. 22C, the second cushioning portion 984 having the second space 983 therein is completed. As illustrated in FIG. 22D, folding a second side wall 922 in a similar manner to above forms another second cushioning portion 984 having the second space 983 therein. When the liquid ejection head 10 is packed in the box unit 900, the second cushioning portions 984 are each placed, in the direction along the shorter side of the liquid ejection head 10, between the side surface of the box member 901 and an edge of the liquid ejection head 10. That is, in the liquid ejection head package according to the present embodiment, the edge of the liquid ejection head 10 opposite the surface having the ejection element substrates thereon comes into contact with the second cushioning portion 984.

Figure 22E:
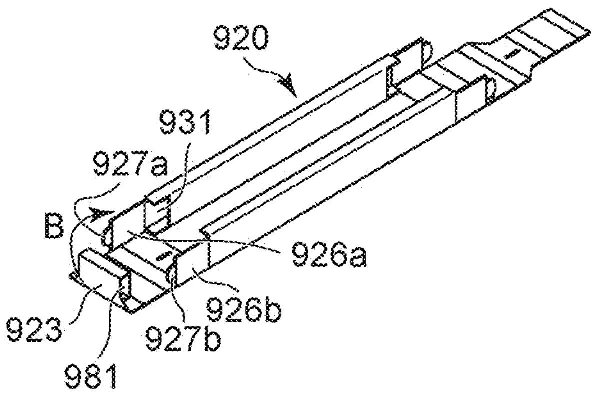
FIG. 22E is a perspective view illustrating a step of forming a first space.

Next, a third side wall 923 is folded inward along lines at least twice, as indicated by arrow B in FIG. 22E, so that the corrugated cardboard is doubled or more, until the third side wall 923 reaches a first fitting portion 931. Thus, a first space 981 having the third side wall 923 as a side wall thereof is formed.

Figure 22F:
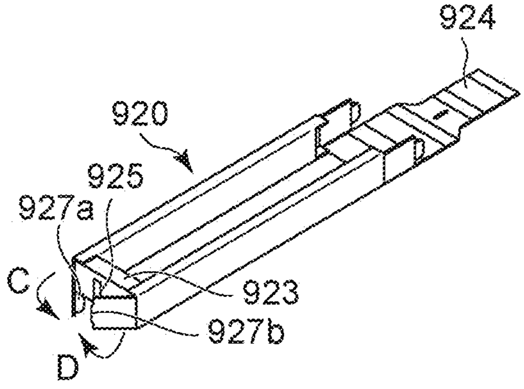
FIG. 22F is a perspective view illustrating a step of securing a third side wall.

Then, fourth flaps 926*a* and 926*b* of the first and second side walls 921 and 922 are folded as indicated by arrow C and arrow D in FIG. 22F, and second insertion portions 927*a* and 927*b* at the tips are inserted into a fourth hole 925 to secure the third side wall 923. A first cushioning portion 982 having the first space 981 therein is thus completed. Folding a fourth side wall 924 in a similar manner to above forms another first cushioning portion 982 having the first space 981 therein. When the liquid ejection head 10 is packed in the box unit 900, the first cushioning portions 982 are placed at positions where they come into contact with the protective members 600. When the liquid ejection head 10 is packed in the bag member 800, the protective members 600 are in contact with the first cushioning portions 982, with the bag member 800 therebetween.

Figure 22G:
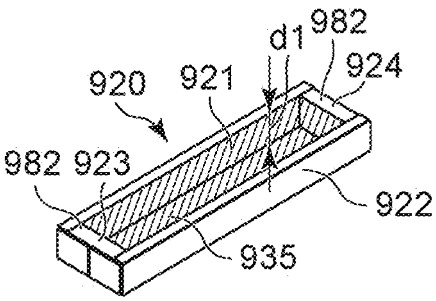
FIG. 22G is a perspective view of the cushioning member.

Thus, as illustrated in FIG. 22G, the first cushioning portions 982 and the second cushioning portions 984 (the first side wall 921, the second side wall 922, the third side wall 923, and the fourth side wall 924) are formed into a frame shape, and the cushioning member 920 having the bottom surface 934 is completed.

The first cushioning portions 982 each have the first space 981 therein, and the second cushioning portions 984 each have the second space 983 therein. Therefore, when the box unit 900 having the liquid ejection head 10 packed therein drops, the first space 981 and the second space 983 are crushed, so that the impact transmitted to the liquid ejection head 10 can be reduced. The length of the first space 981 in the longitudinal direction of the box member can be greater than the length of the second space 983 in the direction along the shorter side of the box member.

The liquid ejection head 10 has, at the ends thereof in the longitudinal direction, the protrusions used for attachment to the main body of the recording apparatus. The thickness of the first cushioning portions 982 is greater than the length of the protrusions. Therefore, even if the box unit 900 having the liquid ejection head 10 packed therein drops, the protrusions can be prevented from penetrating the first cushioning portions 982. This applies not only to the case of transporting a new liquid ejection head 10, but also to the case of transporting a used liquid ejection head 10. That is, even when the protective members 600 are not attached to the used liquid ejection head 10, the protrusions can be prevented from protruding outward from the box unit 900 during transport. The first cushioning portions 982 having a thickness of 40 mm in the longitudinal direction, and the protrusions having a length of 15 mm in the longitudinal direction, can be used.

The cushioning member 920 is separated from the storage member 960, and the bottom surface 934 and four cushioning walls (the first side wall 921, the second side wall 922, the third side wall 923, and the fourth side wall 924) are integrally formed, so that the cushioning performance of the cushioning member 920 is improved.

As illustrated in FIG. 22D, the third side wall 923 has a width varying portion 933. The width varying portion 933 can have a tapered shape. The third side wall 923 thus has a surface with a width W1 and a surface with a width W2. Therefore, when the third side wall 923 is folded, the center thereof has a double structure, whereas the end thereof has a single structure, so that the rigidity of joints between the third side wall 923 and the first and second side walls 921 and 922 can be reduced. With less rigidity, the joints are crushed when the box unit 900 having the liquid ejection head 10 packed therein is dropped, so that the cushioning function can be improved.

As illustrated in FIG. 22G, the cushioning member 920 forms a rectangular parallelepiped space 935 (hatched) in the center, and the liquid ejection head 10 packed in the bag member can be accommodated in the space. As described above, the liquid ejection head 10 can be stored in a lying state. In this case, the protective members 600 attached to the liquid ejection head 10 can be placed to be in contact with two corners S1 and S2 (see FIG. 18) of the first cushioning portions 982 and the second cushioning portion 984, with the bag member therebetween. Additionally, the edge of the liquid ejection head 10 opposite the surface having the ejection element substrates thereon is placed to be in contact with a portion T (see FIG. 18) of the second cushioning portion 984, with the bag member therebetween. Therefore, the liquid ejection head is secured at three points, the corners S1 and S2 and the portion T, against lateral vibration, so that displacement of the liquid ejection head 10 during transport is reduced.

With the configuration in which the liquid ejection head 10 is stored in a lying state, the entire height of the box unit 900 is reduced and the liquid ejection head 10 can be transported stably without falling sideways. Additionally, the depth of the cushioning member 920 is reduced, and this makes it easy to take the liquid ejection head 10 out of the box unit 900. A depth d1 (see FIG. 22G) of the cushioning member 920 can be substantially the same as a thickness w6 (see FIG. 13A) of the protective members 600.

When the liquid ejection head 10 is placed in a lying state and secured at the corners S1 and S2 and the portion T, gaps Q1 and Q2 (see FIG. 18) for inserting hands to take the liquid ejection head 10 out of the cushioning member 920 are provided. The liquid ejection head 10 can thus be easily taken out.

An area of the cushioning member 920 in contact with the bag member 800 can have a smooth surface where the edge of the corrugated cardboard is not exposed. This can reduce the possibility that the bag member 800 will be damaged by contact with the edge of the cushioning member 920.

(Storage Member)

The storage member 960 of the box unit 900 will now be described. The storage member 960 is for storing the spare cover member 210 configured to cover the ejection element substrates of the liquid ejection head 10, separately from the cover member 200. The storage member 960 is stored in the box member 901.

The storage member 960 can be made of corrugated cardboard. The spare cover member 210 has a shape similar to that of the cover member 200. The spare cover member 210 is a spare for covering the ejection element substrates of the liquid ejection head 10 after use.

Figure 23A:
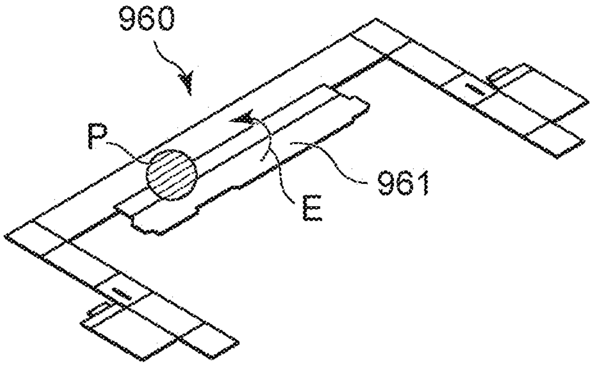
FIG. 23A is a developed view of a storage member.

In the present embodiment, a description will be given of how the storage member 960 is to be folded when it is made of corrugated cardboard. FIG. 23A illustrates the storage member 960 in a state before the corrugated cardboard is folded.

Figure 23B:
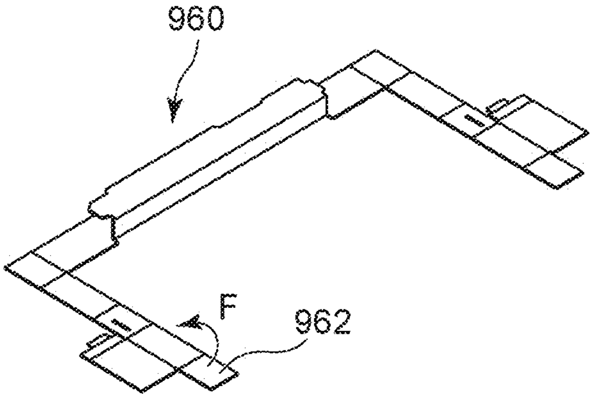
FIG. 23B is a perspective view illustrating a step of folding a surface of the storage member.
Figure 23C:
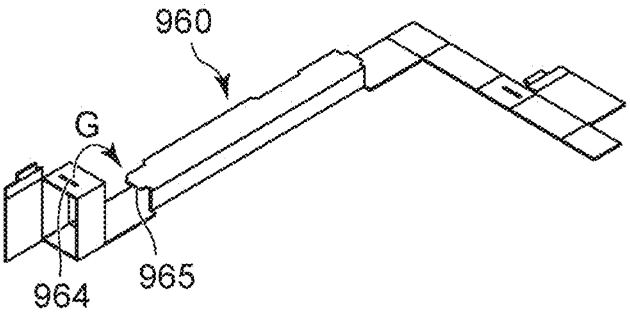
FIG. 23C is a perspective view illustrating a step of inserting a fourth insertion portion into a sixth hole of the storage member.
Figure 23D:
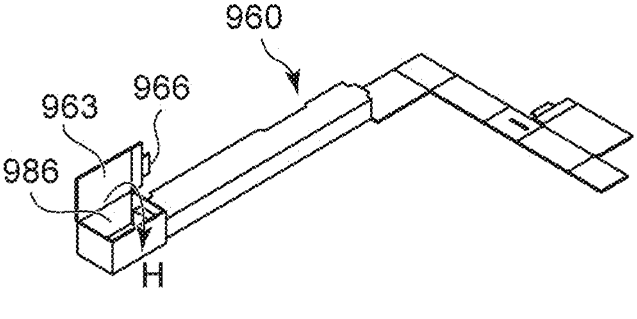
FIG. 23D is a perspective view illustrating a step of folding another surface of the storage member.
Figure 23E:
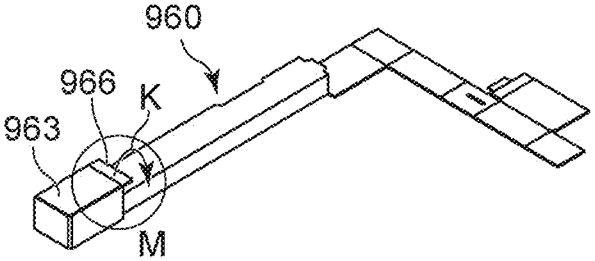
FIG. 23E is a perspective view illustrating a step of folding a surface of the storage member having a fifth insertion portion.
Figure 23F:
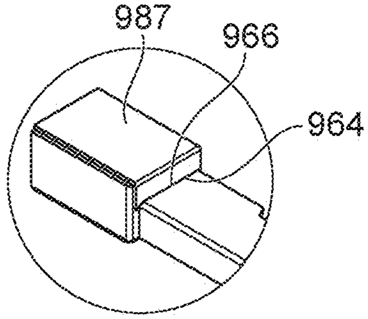
FIG. 23F is a perspective view illustrating a step of inserting the fifth insertion portion into the sixth hole.
Figure 23G:
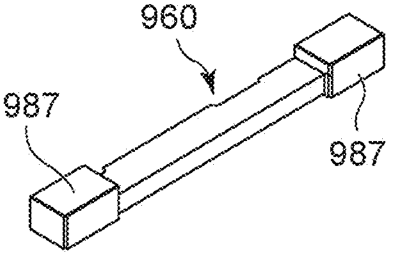
FIG. 23G is a perspective view of the storage member.

First, a first surface 961 is folded along lines as indicated by arrow E. As in the case of the box member, the flutes of the corrugated cardboard of the storage member 960 can run in the longitudinal direction as indicated by P in FIG. 23A. This improves resistance of the storage member 960 to impact in the longitudinal direction. Next, as illustrated in FIG. 23B, a second surface 962 is folded as indicated by arrow F to form a rectangular frame as illustrated in FIG. 23C. The second surface 962 is further folded, as indicated by arrow G, to allow a fourth insertion portion 965 at an end of the first surface to be inserted into a sixth hole 964. Then, as illustrated in FIG. 23D, a third surface 963 is folded in the direction of arrow H, and a surface having a fifth insertion portion 966 is folded in the direction of arrow K as illustrated in FIG. 23E. The fifth insertion portion 966 is then inserted into the sixth hole 964 as illustrated in the enlarged view, FIG. 23F. A third cushioning portion 987 having a third space 986 (see FIG. 23D) therein is thus completed. The other end is assembled in a similar manner, and another third cushioning portion 987 is formed as illustrated in FIG. 23G.

The storage member 960 can thus be formed. When an impact is applied to the storage member 960, the third space is crushed, so that the impact on the spare cover member 210 stored in the storage member 960 can be reduced.

Figure 23H:
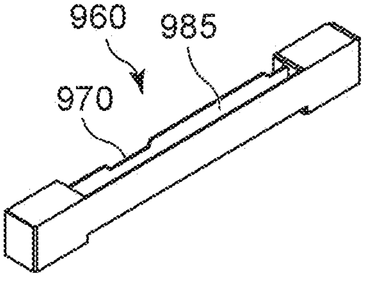
FIG. 23H is a perspective view of the storage member as seen from another angle.

FIG. 23H is a perspective view of the storage member 960 as seen from another angle. The storage member 960 has a storage space 985 for accommodating the spare cover member 210. The storage member 960 has cuts 970 for accommodating engaging and securing portions of the spare cover member 210.

As illustrated in FIG. 18, a width w3 of the third cushioning portion 987 can be substantially the same as a width w4 from the side surface of the box member 901 to the inner side surface of the protective member 600 attached to the liquid ejection head 10 stored in the box member 901. This allows the third cushioning portion 987 to reduce the impact received by the liquid ejection head 10 when the box unit 900 having the liquid ejection head 10 packed therein drops. The third flaps 908*a* and 908*b* have a width w5 and lie over the protective members 600 when the box member 901 is closed. This structure distributes drop impact on the lid.

With the configuration described above, a liquid ejection head package that reduces damage to the liquid ejection head packed in the box member 901 can be provided.

Second Embodiment

A configuration of a liquid ejection head package according to a second embodiment of the present disclosure will now be described. In the following description, only parts that differ from the first embodiment will be mainly described, and the description of the same parts as the first embodiment will be omitted.

The second embodiment differs from the first embodiment in that the liquid ejection head 10 is packed in an upright state in the box member 901. Here, the upright state refers to a state in which the liquid ejection head 10 is packed in the box member 901, with the ejection element substrates 100 of the liquid ejection head 10 substantially parallel to the lid 909. Note that the ejection element substrates 100 do not need to be strictly parallel to the lid 909. It is simply required that the angle formed by the extension of the surface formed by the ejection element substrates 100 and the extension of the lid 909 be less than or equal to 45 degrees.

Figure 24:
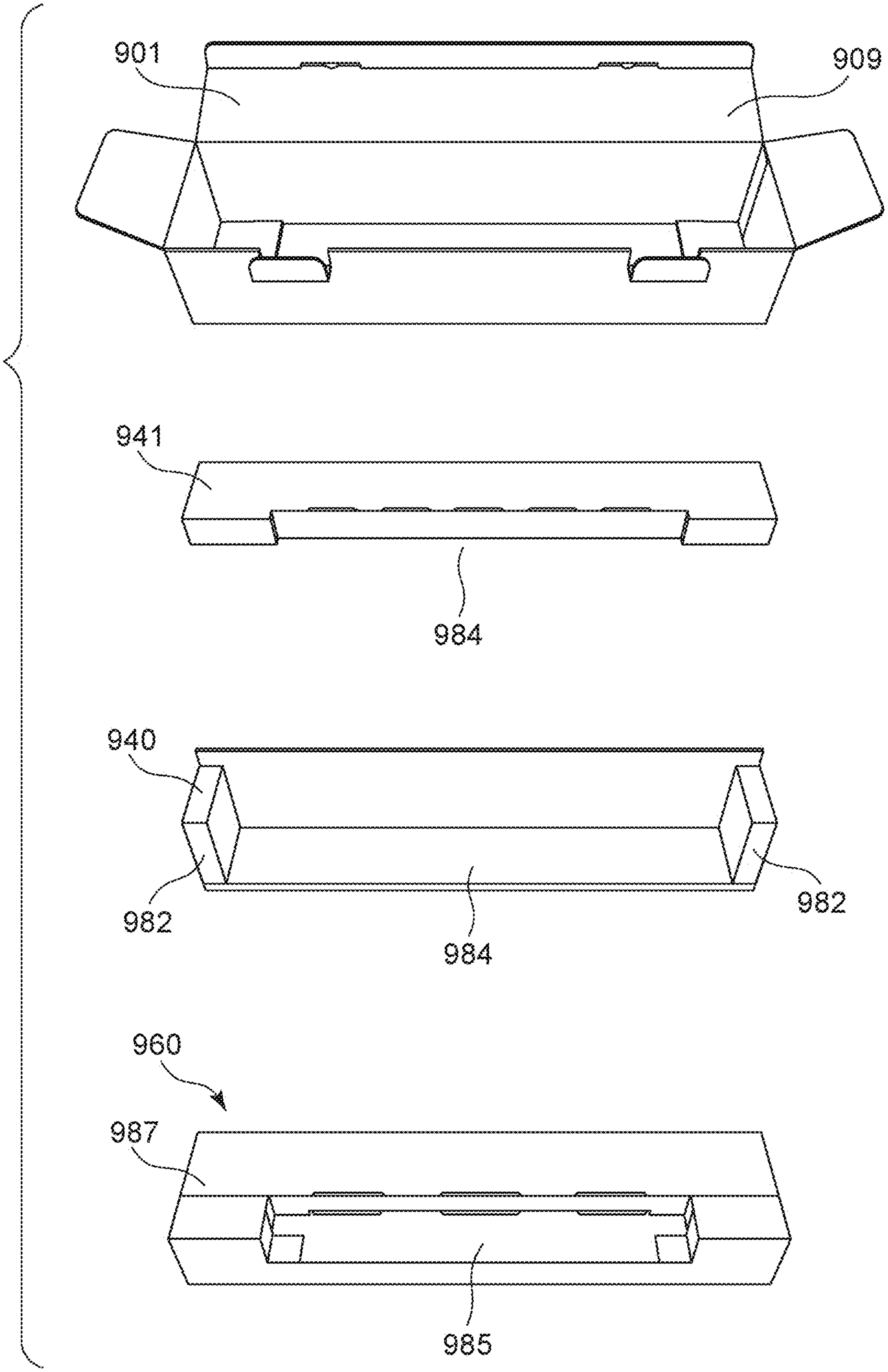
FIG. 24 is an exploded perspective view of the box unit.

FIG. 24 illustrates components of the box unit 900 according to the second embodiment. As a component of the box unit 900, a cushioning member 940 according to the second embodiment has a configuration partially different from the cushioning member 920 according to the first embodiment. Although the cushioning member 920 includes two second cushioning portions 984, the cushioning member 940 includes only one second cushioning portion 984. A second cushioning member 941 includes another cushioning portion 984 independent of the cushioning member 940. The box unit 900 according to the second embodiment does not include the cushioning plate 990, and the second cushioning member 941 serves as the cushioning plate 990. Although the storage member 960 is turned over in FIG. 24, the storage member 960 is configured to have the third cushioning portion 987 at the bottom and the storage space 985 for storing the spare cover member 210 at the top.

Figure 25:
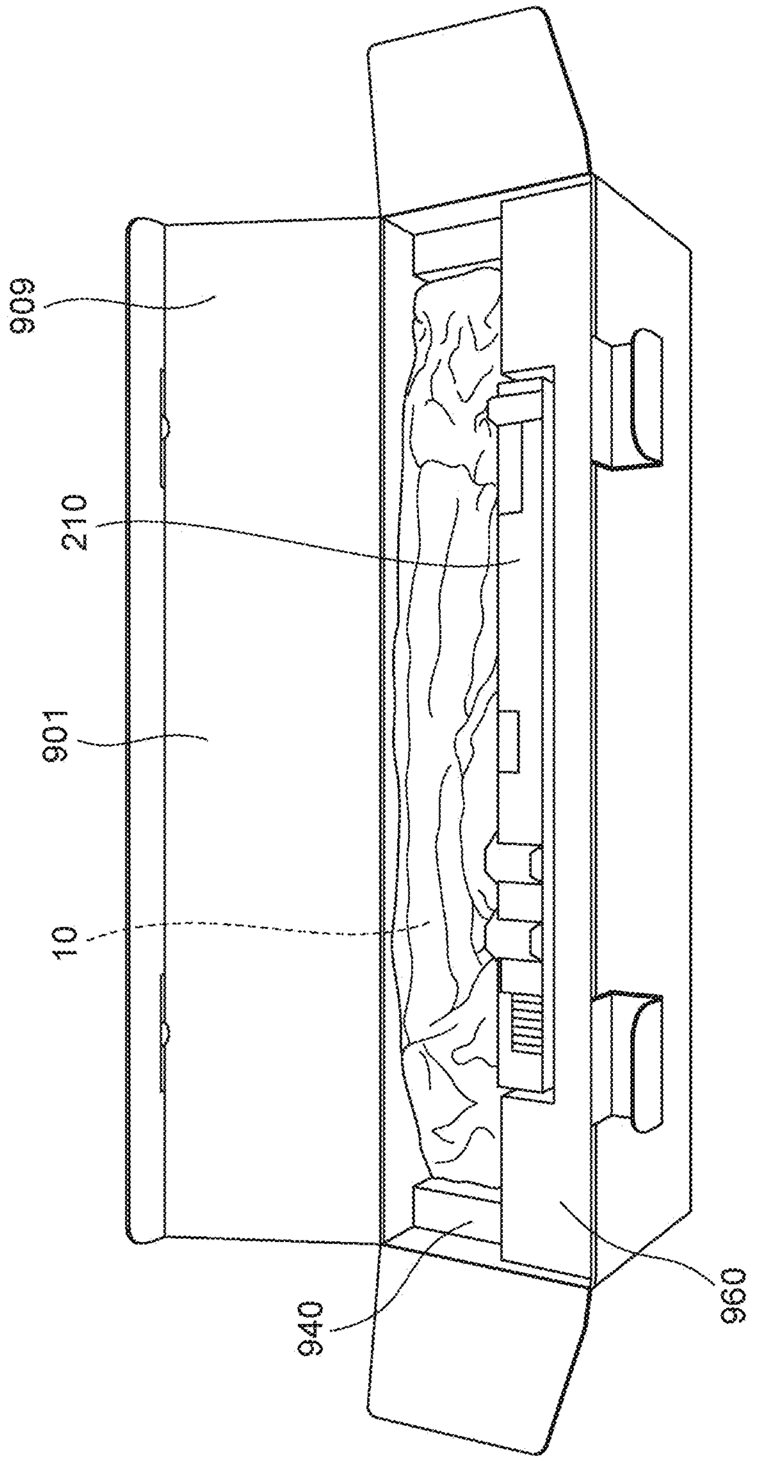
FIG. 25 is a schematic view of the box member and the cushioning member placed therein.

As illustrated in FIG. 25, the liquid ejection head 10 having the protective members 600 attached to both ends thereof in the longitudinal direction can be packed in the box member 901 while being packed in the bag member 800. The storage member 960 is also stored in the box member 901. The spare cover member 210 can be placed on the upper side so that it can be easily taken out of the box member 901.

Figure 26:
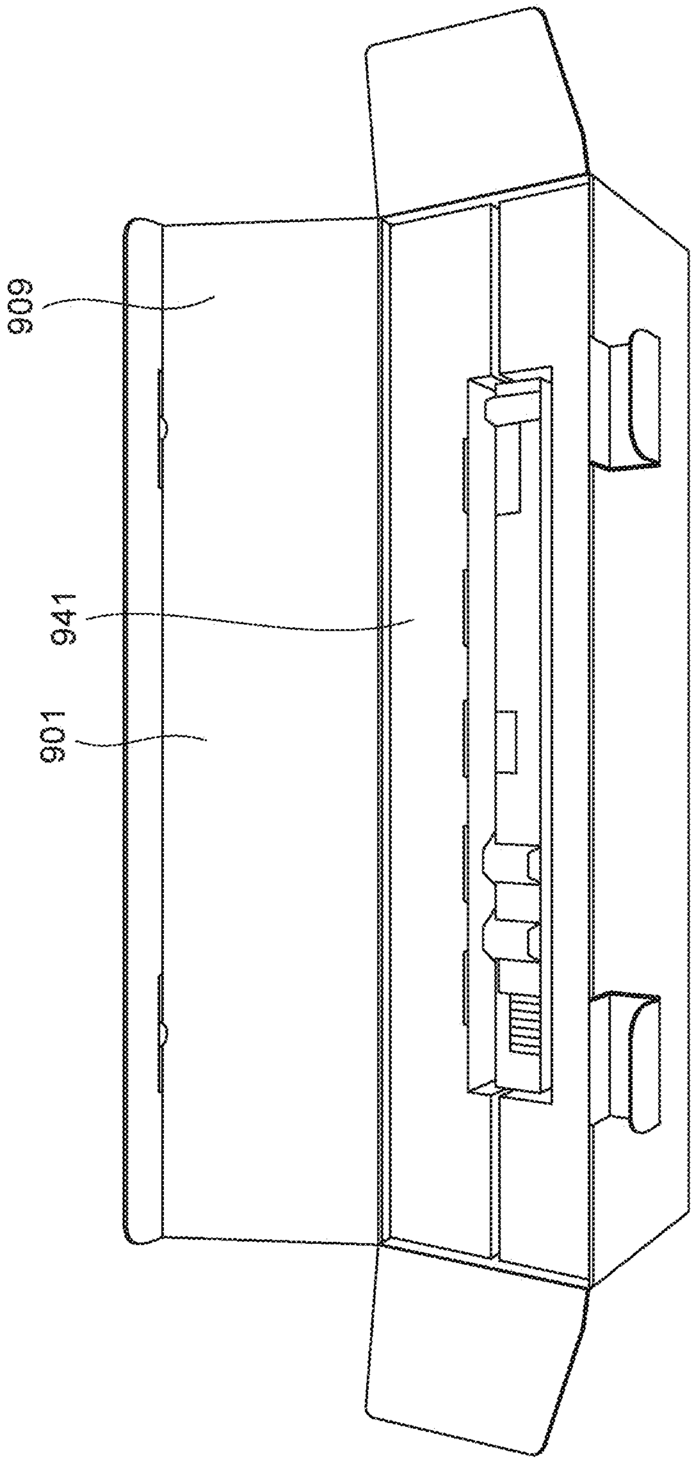
FIG. 26 is a schematic view of the box unit in which a second cushioning member is placed in the box member.

In the package according to the second embodiment, as illustrated in FIG. 26, the second cushioning member 941 is placed above the liquid ejection head 10. This can reduce impact applied to the upper part of the liquid ejection head 10.

Figure 27:
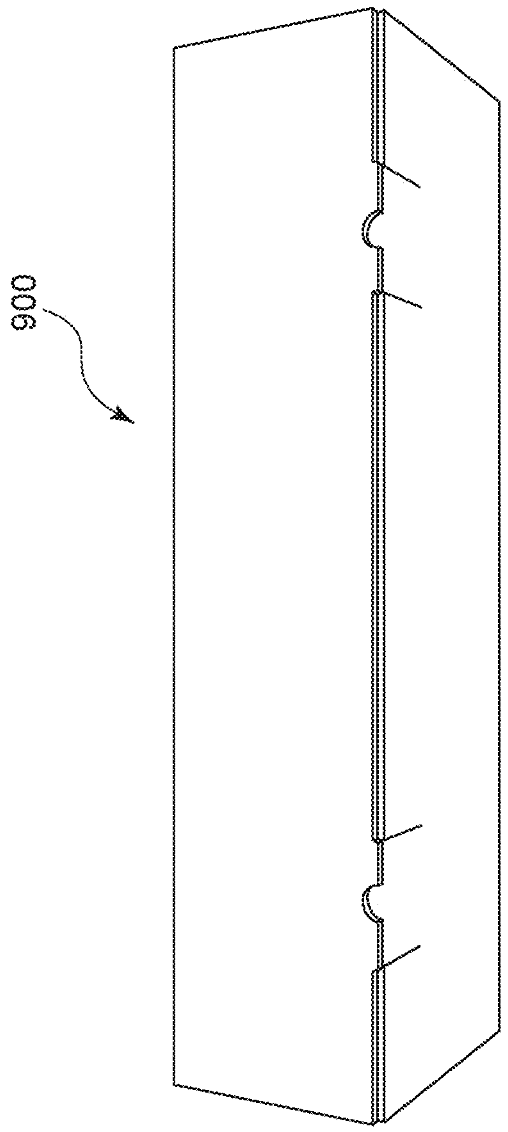
FIG. 27 is a perspective view of the liquid ejection head package.

As illustrated in FIG. 27, the liquid ejection head package is completed by closing the lid 909 of the box member 901. As in the second embodiment, even when the liquid ejection head is packed in an upright state in the box member, the cushioning members can reduce damage to the liquid ejection head.

The configurations of the embodiments described above can be combined where appropriate.

In summary, the present disclosure includes the components described below.

The present disclosure provides a liquid ejection head package that reduces damage to protective members and a liquid ejection head packed in a box member.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-146696 filed Sep. 11, 2023, which is hereby incorporated by reference herein in its entirety.

What is claimed is:

1. A liquid ejection head package comprising:

a liquid ejection head configured to eject liquid;

a protective member configured to protect an end of the liquid ejection head in a longitudinal direction;

a box member configured to pack the liquid ejection head having the protective member attached to the end thereof in the longitudinal direction, wherein the box member includes a cushioning member at a position where the cushioning member contacts the protective member, the cushioning member including a first cushioning portion having a first space therein; and a cover member configured to cover an ejection element substrate of the liquid ejection head, wherein the cover member is attached to the liquid ejection head, wherein a spare cover member configured to cover the ejection element substrate is stored in the box member, separately from the cover member.

2. The liquid ejection head package according to claim 1, wherein the box member is made of corrugated cardboard.

3. The liquid ejection head package according to claim 2, wherein flutes of the corrugated cardboard on a surface of the box member on which the liquid ejection head is to be placed run in a longitudinal direction of the box member.

4. The liquid ejection head package according to claim 1, wherein the first cushioning portion is made of corrugated cardboard and the first space in the first cushioning portion is formed by folding the corrugated cardboard.

5. The liquid ejection head package according to claim 4, wherein the first space in the first cushioning portion is formed by folding the corrugated cardboard at least twice.

6. The liquid ejection head package according to claim 1, further comprising protective members configured to protect both ends of the liquid ejection head in the longitudinal direction, wherein the cover member is secured to the liquid ejection head by sandwiching the cover member between the protective members.

7. The liquid ejection head package according to claim 1, wherein a storage member having a storage space for accommodating the spare cover member is stored in the box member.

8. The liquid ejection head package according to claim 7, wherein the storage member is made of corrugated cardboard, and wherein the storage member includes a different cushioning portion at an end of the storage space in a longitudinal direction, the different cushioning portion having a space for protecting the spare cover member.

9. The liquid ejection head package according to claim 1, wherein the liquid ejection head and the protective member are packed in a bag member and stored in the box member, and wherein the protective member contacts the first cushioning portion, with the bag member therebetween.

* * * * *